US012804280B2

(12) United States Patent
Takeda

(10) Patent No.: US 12,804,280 B2
(45) Date of Patent: Nov. 17, 2026

(54) PHOTODETECTION DEVICE

(71) Applicant: Sony Semiconductor Solutions Corporation, Kanagawa (JP)

(72) Inventor: Naotsugu Takeda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 316 days.

(21) Appl. No.: 18/711,246

(22) PCT Filed: Nov. 14, 2022

(86) PCT No.: PCT/JP2022/042169
§ 371 (c)(1),
(2) Date: Feb. 28, 2025

(87) PCT Pub. No.: WO2023/132129
PCT Pub. Date: Jul. 13, 2023

(65) Prior Publication Data

US 2026/0012715 A1 Jan. 8, 2026

(30) Foreign Application Priority Data

Jan. 6, 2022 (JP) ................................ 2022-001284

(51) Int. Cl.
*H04N 25/704* (2023.01)
*H04N 25/47* (2023.01)
*H04N 25/77* (2023.01)

(52) U.S. Cl.
CPC ........... *H04N 25/704* (2023.01); *H04N 25/47* (2023.01); *H04N 25/77* (2023.01)

(58) Field of Classification Search
CPC ...... H04N 25/704; H04N 25/77; H04N 25/47; H04N 25/70
See application file for complete search history.

(56) References Cited

U.S. PATENT DOCUMENTS

2015/0256778 A1* 9/2015 Kusaka .................... G02B 7/34 348/280
2019/0158770 A1* 5/2019 Kusaka .................... G02B 7/34
(Continued)

FOREIGN PATENT DOCUMENTS

JP 2014072541 A 4/2014
JP 2020088724 A 6/2020
(Continued)

OTHER PUBLICATIONS

International Search Report (PCT/ISA/210), International Application No. PCT/JP2022/042169, dated Jan. 31, 2023.

*Primary Examiner* — Kelly L Jerabek
(74) *Attorney, Agent, or Firm* — Michael Best & Friedrich LLP

(57) ABSTRACT

Event-based vision sensors that support image plane phase difference method AF functions are disclosed. In one example, a photodetection device includes first and second pixels respectively configured to photoelectrically convert incident light from one side and an opposite side to generate first and second currents. First and second luminance circuits respectively corresponding to the first and second pixels generate first and second luminance signals, and first and second current comparison circuits respectively corresponding to the first and second pixels compare the first and second luminance signals with a reference signal and convert them into first and second digital signals. A controller adjusts a focal position of the incident light on the basis of the first digital signal and the second digital signal.

17 Claims, 22 Drawing Sheets

(56) References Cited

U.S. PATENT DOCUMENTS

| | | | | |
|---|---|---|---|---|
| 2020/0128172 | A1* | 4/2020 | Nakata | G02B 7/34 |
| 2020/0260039 | A1* | 8/2020 | Niwa | H04N 25/47 |
| 2021/0051288 | A1* | 2/2021 | Niwa | H04N 25/47 |
| 2021/0067703 | A1* | 3/2021 | Kadambala | H04N 23/71 |
| 2021/0258526 | A1* | 8/2021 | Kusaka | G02B 7/34 |
| 2021/0344863 | A1* | 11/2021 | Niwa | H04N 25/47 |

FOREIGN PATENT DOCUMENTS

| | | | |
|---|---|---|---|
| JP | 2021044847 | A | 3/2021 |
| JP | 2021093610 | A | 6/2021 |
| WO | 2019087472 | A1 | 5/2019 |

* cited by examiner

PHOTODETECTION DEVICE

TECHNICAL FIELD

The present disclosure relates to a photodetection device.

BACKGROUND ART

An event-base vision sensor (EVS) is an image sensor that detects a luminance change of each pixel. In the EVS, the luminance change is output, and an output value corresponding to an amount of incident light is not output. Therefore, it has been difficult to apply an auto focus (AF) function of an image plane phase difference method to the EVS.

CITATION LIST

Patent Document

Patent Document 1: International Patent Publication No. 2019/087472

SUMMARY OF THE INVENTION

Problems to be Solved by the Invention

Provided is a photodetection device that detects a luminance change and to which an AF function of an image plane phase difference method can be easily applied.

Solutions to Problems

A photodetector according to one aspect of the present disclosure includes: a plurality of first pixels configured to photoelectrically convert incident light from a portion on one side to generate a first current; a plurality of second pixels configured to photoelectrically convert the incident light from a portion on a side opposite to the portion on the one side of each of the first pixels to generate a second current; a plurality of first luminance circuits provided individually corresponding to the plurality of first pixels and configured to generate a first luminance signal according to the first current; a plurality of second luminance circuits provided individually corresponding to the plurality of second pixels and configured to generate a second luminance signal according to the second current; a plurality of first current comparison circuits provided individually corresponding to the plurality of first pixels, and configured to compare the first luminance signal with a reference signal and convert the first luminance signal into a first digital signal; a plurality of second current comparison circuits provided individually corresponding to the plurality of second pixels, and configured to compare the second luminance signal with the reference signal and convert the second luminance signal into a second digital signal; and a control unit configured to adjust a focal position of the incident light on the basis of the first digital signal and the second digital signal.

The control unit adjusts the focal position such that the first and second digital signals from adjacent first and second pixels among the first pixels and the second pixels are substantially identical.

The plurality of first pixels and the plurality of second pixels are alternately arranged adjacent to each other, and the control unit determines a shift direction and a shift amount of the focal position on the basis of an array of the first digital signals from the plurality of first pixels and an array of the second digital signals from the plurality of second pixels.

The control unit adjusts a focal position such that an array of the first digital signals from the plurality of first pixels and an array of the second digital signals from the plurality of second pixels are substantially identical.

The photodetection device further include: a plurality of first current-voltage conversion circuits provided individually corresponding to the plurality of first pixels and configured to generate a first voltage signal according to the first current; and a plurality of second current-voltage conversion circuits provided individually corresponding to the plurality of second pixels and configured to generate a second voltage signal according to the second current.

Each of the first current-voltage conversion circuits includes: a first conversion transistor configured to convert the first current into a first voltage signal and output the first voltage signal from a first gate; a first current source transistor configured to supply a predetermined constant current to a first output signal line connected to the first gate; and a first voltage supply transistor configured to supply a constant voltage according to the predetermined constant current from the first output signal line to a source of the first conversion transistor, and each of the second current-voltage conversion circuits includes: a second conversion transistor configured to convert the second current into a second voltage signal and output the second voltage signal from a second gate; a second current source transistor configured to supply a predetermined constant current to a second output signal line connected to the second gate; and a second voltage supply transistor configured to supply a constant voltage according to the predetermined constant current from the second output signal line to a source of the second conversion transistor.

Each of the first luminance circuits includes: a third conversion transistor configured to convert the first current into a third voltage signal and output the third voltage signal from a gate, each of the second luminance circuits includes: a fourth conversion transistor configured to convert the second current into a fourth voltage signal and output the fourth voltage signal from a gate, each of the first current comparison circuits includes: a third current source transistor connected between a high voltage source and a first output unit and having a gate connected to a gate of the third conversion transistor, the third current source transistor being configured to cause a flow of a third current according to the first current; and a first reference current transistor connected between the first output unit and a low-voltage source and having a gate configured to receive the reference signal, the first reference current transistor being configured to cause a flow of a first reference current according to the reference signal, and each of the second current comparison circuits includes: a fifth current source transistor connected between the high voltage source and a second output unit and having a gate connected to a gate of the fourth conversion transistor, the fifth current source transistor being configured to cause a flow of a fifth current according to the second current; and a second reference current transistor connected between the second output unit and the low-voltage source and having a gate configured to receive the reference signal, the second reference current transistor being configured to cause a flow of a second reference current according to the reference signal.

Each of the first current comparison circuits outputs a first digital signal from the first output unit in a case where the third current is larger than the first reference current, each of the first current comparison circuits outputs a second digital signal having inverse logic with respect to the first digital signal from the first output unit in a case where the third current is smaller than the first reference current, each of the second current comparison circuits outputs the first digital signal from the second output unit in a case where the fifth current is larger than the second reference current, and each of the second current comparison circuits outputs the second digital signal from the second output unit in a case where the fifth current is smaller than the second reference current.

A first buffer connected to the first output unit and a second buffer connected to the second output unit are further included.

The photodetection device further includes: a plurality of third pixels configured to photoelectrically convert the incident light received on an entire surface to generate a third current, and the plurality of first pixels and the plurality of second pixels are arranged adjacent to the plurality of third pixels and are alternately arranged substantially evenly.

The photodetection device is formed by stacking: a first semiconductor chip including each of the first and second pixels; and a second semiconductor chip including each of the first and second current-voltage conversion circuits, each of the first and second luminance circuits, and each of the first and second current comparison circuits.

The photodetection device is formed by stacking: a first semiconductor chip including the plurality of first and second pixels, the first and second conversion transistors, and the first and second voltage supply transistors; and a second semiconductor chip including the first and second current source transistors, each of the first and second luminance circuits, and each of the first and second current comparison circuits.

Each of the first luminance circuits includes: a first conversion transistor configured to convert the first current into a first voltage signal and output the first voltage signal from a first gate; a first current source transistor configured to supply a predetermined constant current to a first output signal line connected to the first gate; and a first voltage supply transistor configured to supply a constant voltage according to the predetermined constant current from the first output signal line to a source of the first conversion transistor, each of the second luminance circuits includes: a second conversion transistor configured to convert the second current into a second voltage signal and output the second voltage signal from a second gate; a second current source transistor configured to supply a predetermined constant current to a second output signal line connected to the second gate; and a second voltage supply transistor configured to supply a constant voltage according to the predetermined constant current from the second output signal line to a source of the second conversion transistor, each of the first current comparison circuits converts the first voltage signal into the first digital signal as the first luminance signal, and each of the second current comparison circuits converts the second voltage signal into the second digital signal as the second luminance signal.

Each of the first luminance circuits includes: a first conversion transistor configured to convert the first current into a first voltage signal and output the first voltage signal from a first gate; a first current source transistor configured to supply a predetermined constant current to a first output signal line connected to the first gate; and a first voltage supply transistor configured to supply a constant voltage according to the predetermined constant current from the first output signal line to a source of the first conversion transistor, each of the second luminance circuits includes: a second conversion transistor configured to convert the second current into a second voltage signal and output the second voltage signal from a second gate; a second current source transistor configured to supply a predetermined constant current to a second output signal line connected to the second gate; and a second voltage supply transistor configured to supply a constant voltage according to the predetermined constant current from the second output signal line to a source of the second conversion transistor, each of the first current comparison circuits converts a gate voltage of the first voltage supply transistor into the first digital signal as the first luminance signal, and each of the second current comparison circuits converts a gate voltage of the second voltage supply transistor into the second digital signal as the second luminance signal.

In a case where logic of the first and second digital signals is biased to one side, the control unit changes the reference signal.

The first and second pixels are adjacent to each other and constitute a plurality of third pixels configured to photoelectrically convert the incident light received on an entire surface to generate a third current.

MODE FOR CARRYING OUT THE INVENTION

Figure 1:
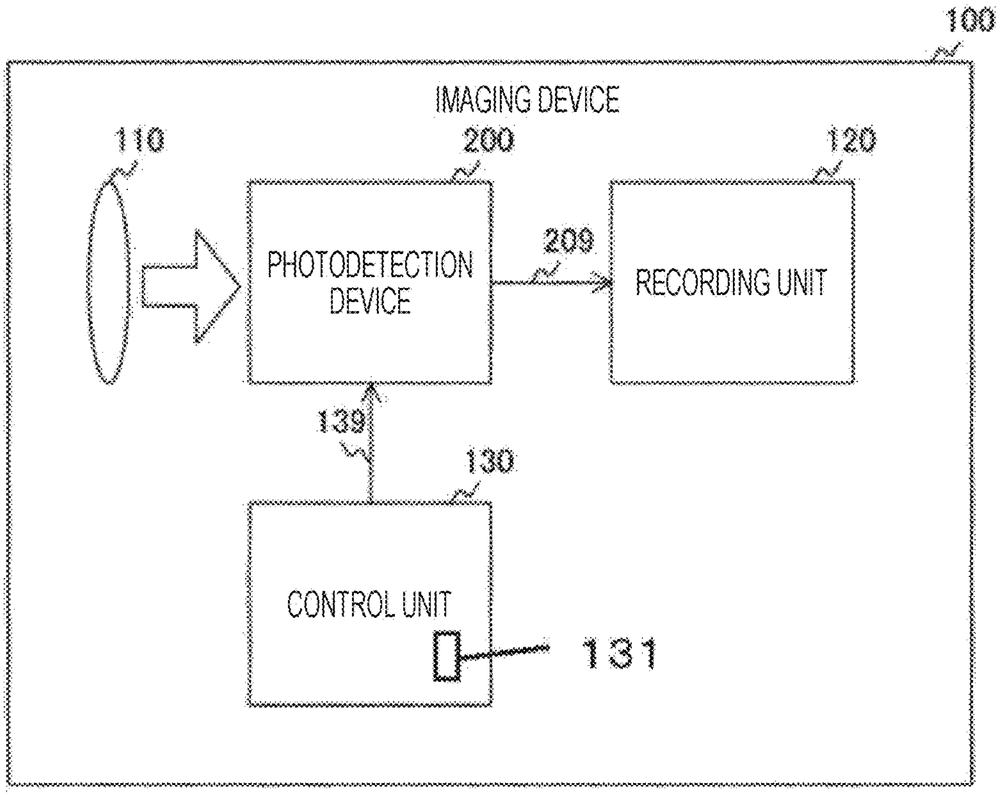
FIG. 1 is a block diagram illustrating a configuration example of an imaging device in a first embodiment.

Specific embodiments to which the present technology is applied will be described below in detail with reference to the drawings. The drawings are schematic or conceptual, and the ratio of each part and the like are not necessarily the same as actual ones. In the specification and the drawings, elements similar to the elements previously described with reference to previously described drawings are denoted by the same reference numerals, and the detailed description thereof will be omitted as appropriate.

A synchronous solid-state imaging element that captures image data (frames) in synchronization with a synchronization signal such as a vertical synchronization signal is used in an imaging device or the like. With these general synchronous solid-state imaging elements, image data may be obtained only at every synchronization signal cycle (for example, 1/60 second), so that it is difficult to cope with a case where higher-speed processing is required in a field regarding traffic, robot, and the like.

Therefore, there has been proposed an asynchronous photodetection device (hereinafter, also referred to as an EVS) provided with, for each pixel, an address event detection circuit for detecting a fact that a light amount of a pixel exceeds a threshold value as an event in real time. The address event detection circuit is provided with a current-voltage conversion circuit including two N-type transistors connected in a loop shape, and a photocurrent from a photodiode is converted into a voltage signal by the circuit.

In the EVS, data can be generated and output at a much higher speed than a synchronous solid-state imaging element. Therefore, for example, in a transportation field, the EVS can improve safety by executing processing of recognizing an image of a person or an obstacle at high speed.

First Embodiment

FIG. 1 is a block diagram illustrating a configuration example of an imaging device 100 in a first embodiment. The imaging device 100 captures image data, and includes an imaging lens 110, a photodetection device (EVS) 200, a recording unit 120, and a control unit 130. As the imaging device 100, a camera mounted on an industrial robot, an in-vehicle camera, and the like are assumed.

The imaging lens 110 condenses and guides incident light to the photodetection device 200. The photodetection device 200 photoelectrically converts the incident light to capture image data. The photodetection device 200 executes predetermined signal processing such as image recognition processing on the captured image data, and outputs the processed data to the recording unit 120 via a signal line 209. The recording unit 120 records the data from the photodetection device 200. The control unit 130 controls the photodetection device 200 to capture image data. Furthermore, the control unit 130 changes a relative distance between the imaging lens 110 and the photodetection device 200 to adjust a focal position of the incident light.

Figure 2:
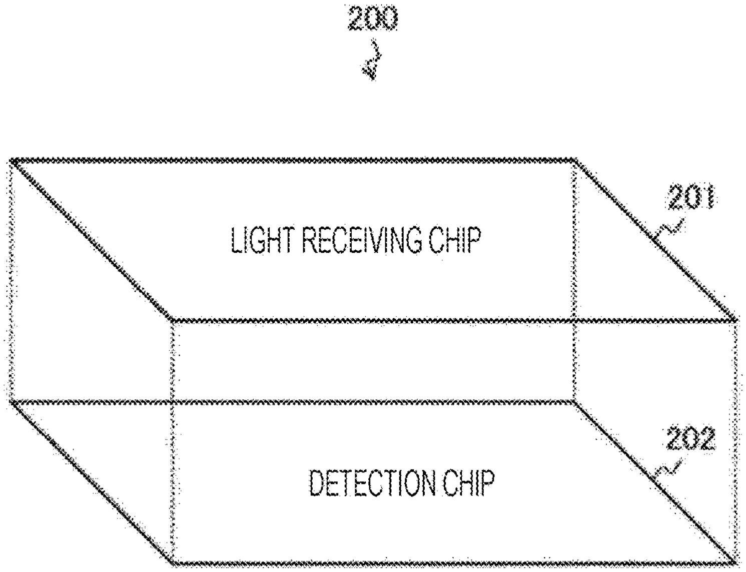
FIG. 2 is a diagram illustrating an example of a stacked structure of a photodetection device in the first embodiment.

FIG. 2 is a diagram illustrating an example of a stacked structure of the photodetection device 200 in the first embodiment. The photodetection device 200 includes a stacked detection chip 202 and light receiving chip 201. These chips 201 and 202 are bonded by a via or the like. Note that, they may also be joined to each other by Cu—Cu joint or a bump in addition to the via.

Figure 3:
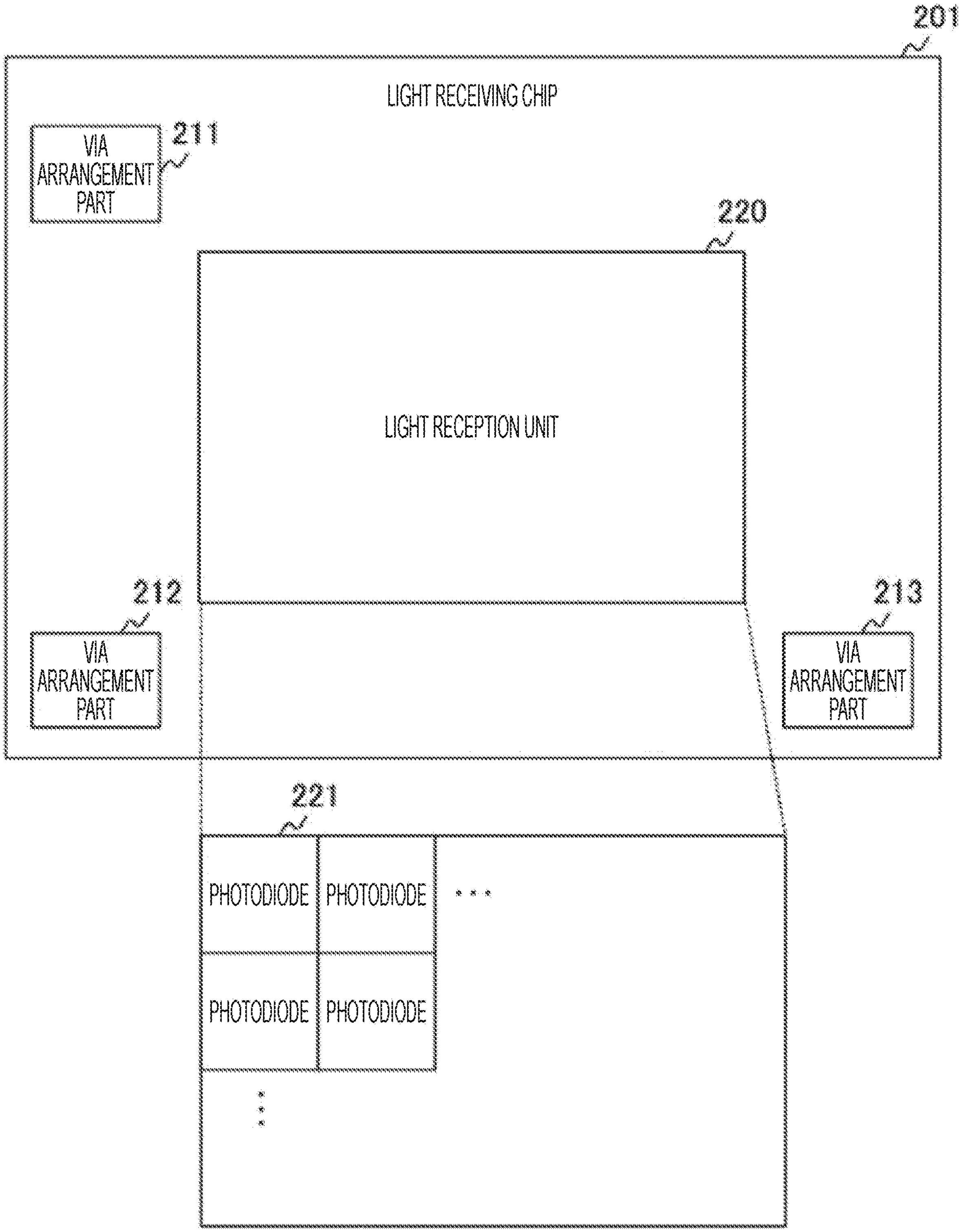
FIG. 3 is a diagram illustrating an example of a plan view of a light receiving chip in the first embodiment.

FIG. 3 is a diagram illustrating an example of a plan view of the light receiving chip 201 in the first embodiment. The light receiving chip 201 is provided with a light reception unit 220 and via arrangement parts 211 to 213.

In the via arrangement parts 211 to 213, vias (for example, through silicon via (TSV)) connected to the detection chip 202 are arranged. Furthermore, in the light reception unit 220, a plurality of photodiodes 221 is arrayed in a two-dimensional lattice manner. The photodiodes 221 photoelectrically convert incident light to generate a photocurrent. Each of the photodiodes 221 is assigned with a pixel address including a row address and a column address, and is treated as a pixel.

Figure 4:
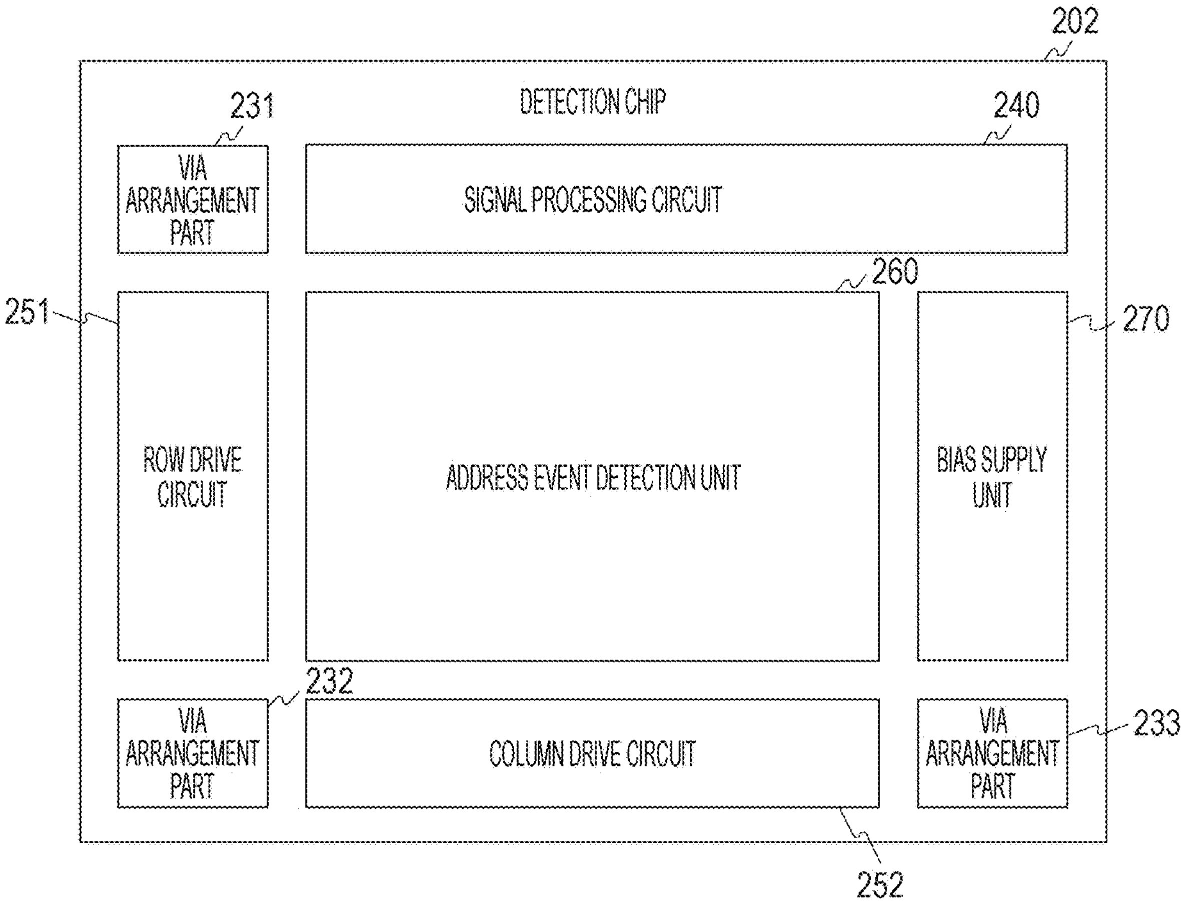
FIG. 4 is a plan view illustrating an example of a detection chip in the first embodiment.

FIG. 4 is a plan view illustrating an example of the detection chip 202 in the first embodiment. The detection chip 202 is provided with via arrangement parts 231 to 233, a signal processing circuit 240, a row drive circuit 251, a column drive circuit 252, an address event detection unit 260, and a bias supply unit 270. In the via arrangement parts 231 to 233, vias (for example, TSVs) connected to the light receiving chip 201 are arranged.

The address event detection unit 260 generates a detection signal from the photocurrent of each of the plurality of photodiodes 221 and outputs the same to the signal processing circuit 240. This detection signal is a 1-bit signal indicating whether or not a fact that a light amount of the incident light exceeds a predetermined threshold value is detected as an address event.

The row drive circuit 251 selects a row address and causes the address event detection unit 260 to output a detection signal corresponding to the row address.

The column drive circuit 252 selects a column address and cause the address event detection unit 260 to output a detection signal corresponding to the column address.

The signal processing circuit 240 executes predetermined signal processing on the detection signal from the address event detection unit 260. The signal processing circuit 240 arrays the detection signals as pixel signals in a two-dimensional lattice manner, and acquires the image data having 1-bit information for each pixel. Then, the signal processing circuit 240 executes signal processing such as image recognition processing on the image data. Furthermore, the signal processing circuit 240 processes a digital signal Vcm from an address event detection circuit 300 in FIG. 6, and outputs the digital signal Vcm to the control unit 130.

Figure 7:
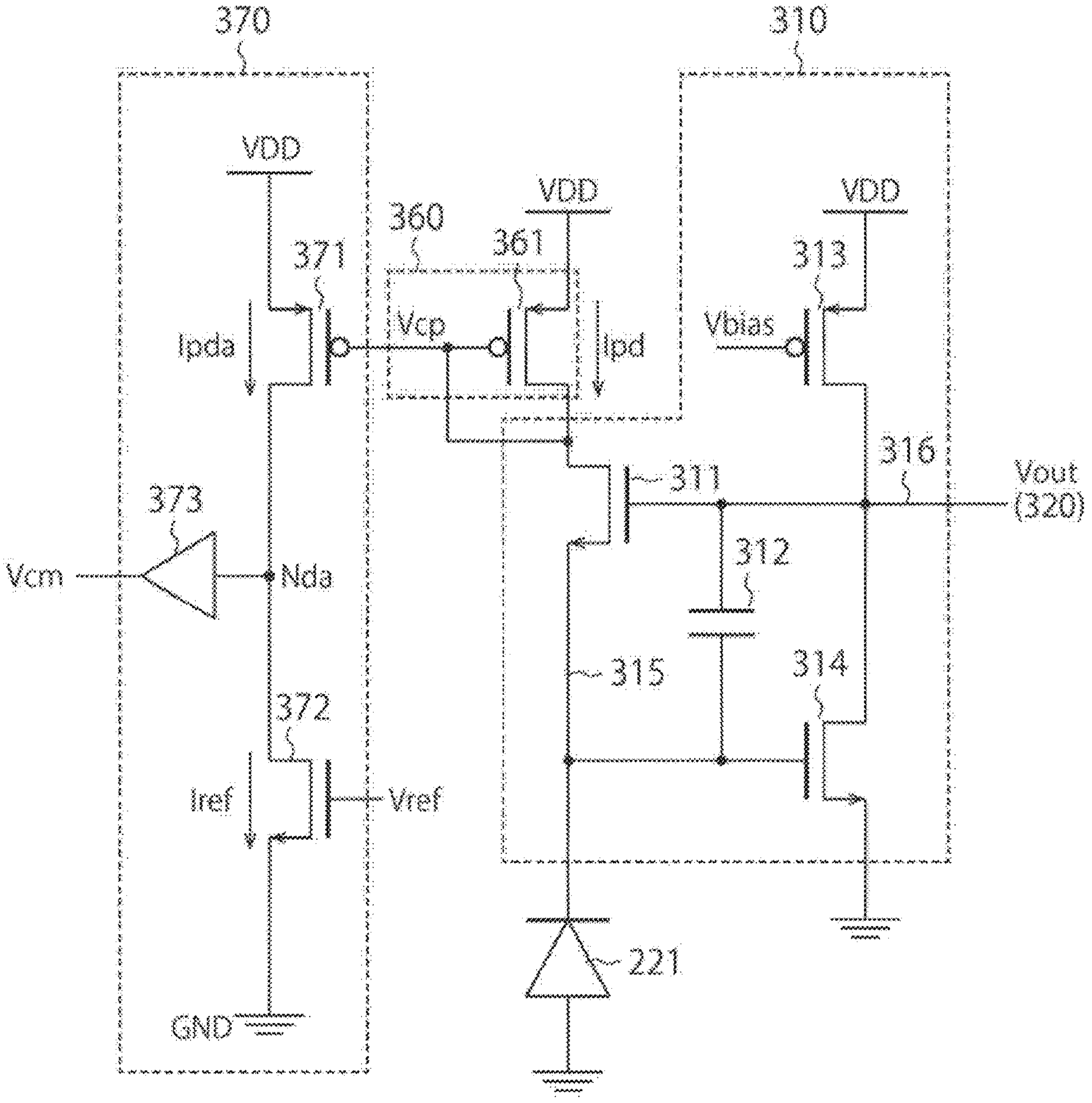
FIG. 7 is a circuit diagram illustrating a configuration example of a current-voltage conversion circuit, a luminance circuit, and a current comparison circuit in the first embodiment.

The bias supply unit 270 generates bias voltages such as a bias voltage Vbias and a reference voltage Vref of FIG. 7, and supplies the bias voltages to the address event detection circuit 300. The bias supply unit 270 may supply the bias voltage Vbias and the reference voltage Vref for every row.

Figure 5:
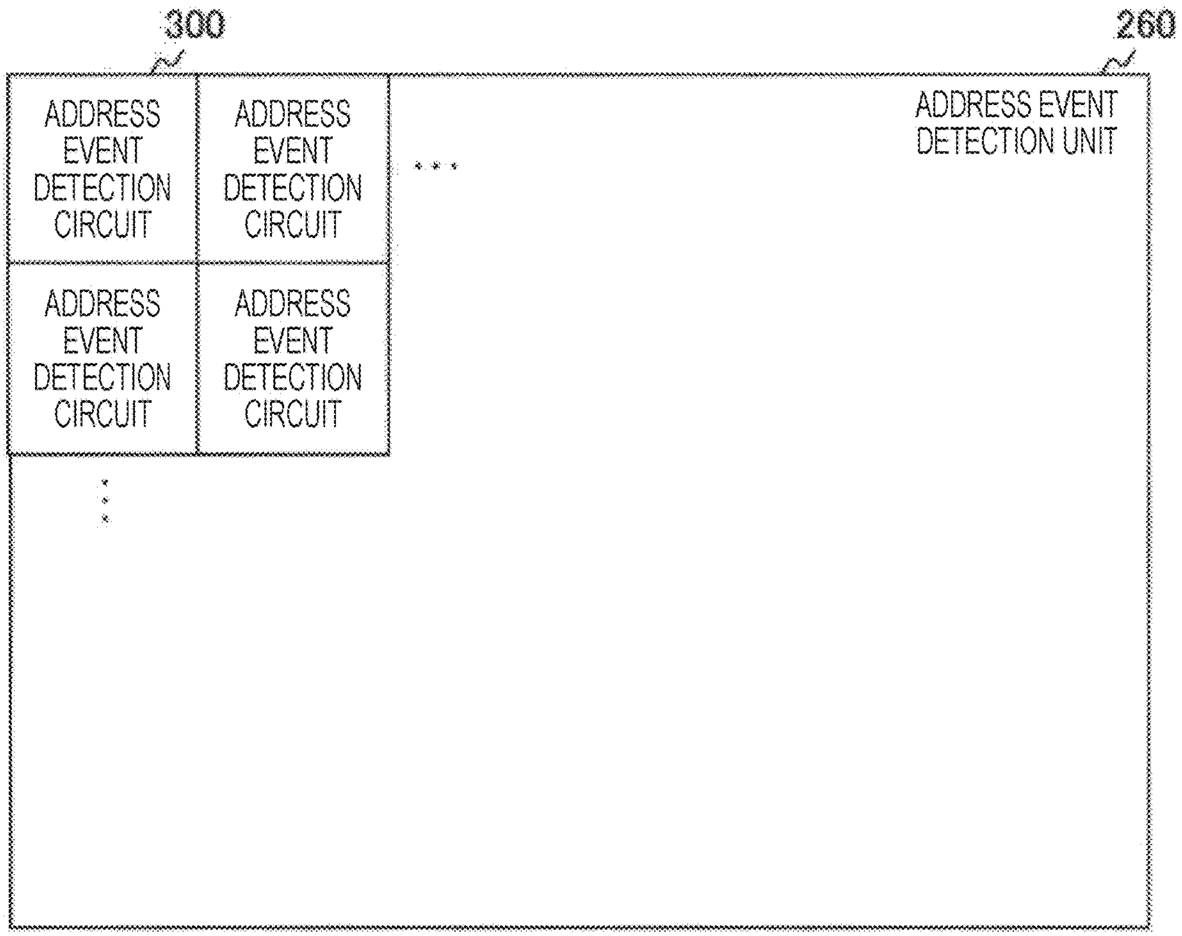
FIG. 5 is a plan view illustrating an example of an address event detection unit in the first embodiment.

FIG. 5 is a plan view illustrating an example of the address event detection unit 260 in the first embodiment. In the address event detection unit 260, a plurality of address event detection circuits 300 is arrayed in a two-dimensional lattice manner. Each of the address event detection circuits 300 to which a pixel address is assigned is connected to the photodiode 221 having the same address. The address event detection circuit 300 is provided corresponding to each of the photodiodes 221 as pixels. The address event detection circuit 300 quantizes a voltage signal according to the photocurrent from the corresponding photodiode 221 and outputs the same as the detection signal. Furthermore, the address event detection circuit 300 outputs the digital signal Vcm according to the photocurrent from the corresponding photodiode 221 in order to execute the image plane phase difference AF.

Figure 6:
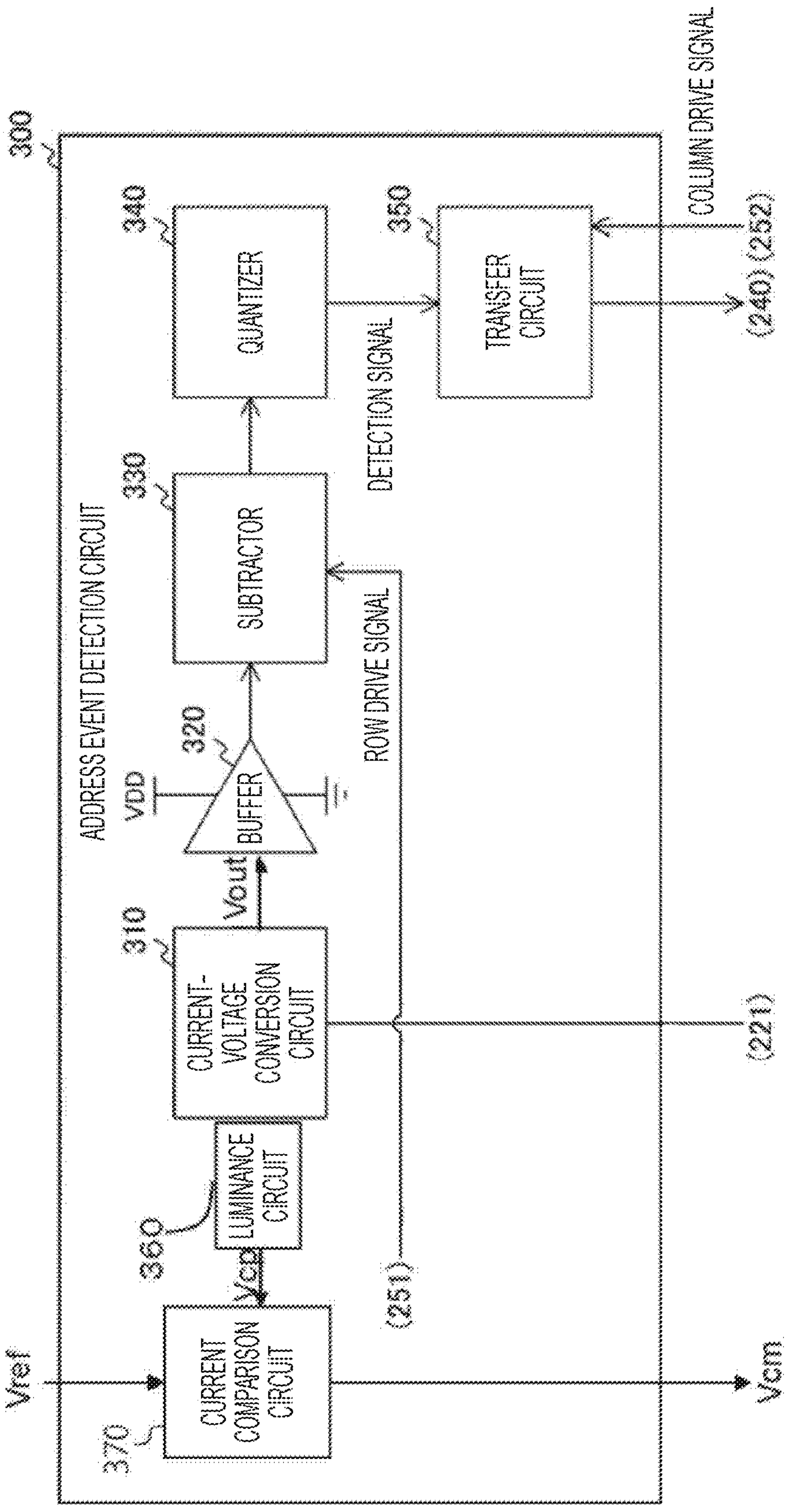
FIG. 6 is a block diagram illustrating a configuration example of an address event detection circuit in the first embodiment.

FIG. 6 is a block diagram illustrating a configuration example of the address event detection circuit 300 in the first embodiment. The address event detection circuit 300 includes a current-voltage conversion circuit 310, a buffer 320, a subtractor 330, a quantizer 340, a transfer circuit 350, a luminance circuit 360, and an AD conversion circuit 370.

The current-voltage conversion circuit 310 converts the photocurrent from the corresponding photodiode 221 into a voltage signal Vout. The current-voltage conversion circuit 310 supplies the voltage signal Vout to the buffer 320.

The buffer 320 corrects the voltage signal Vout from the current-voltage conversion circuit 310. The buffer 320 outputs the corrected voltage signal to the subtractor 330.

The subtractor 330 lowers a level of the voltage signal Vout from the buffer 320 in accordance with a row drive signal from the row drive circuit 251. The subtractor 330 supplies the lowered voltage signal Vout to the quantizer 340.

The quantizer 340 quantizes the voltage signal Vout from the subtractor 330 into a digital signal, and outputs the digital signal to the transfer circuit 350 as a detection signal.

The transfer circuit 350 transfers the detection signal from the quantizer 340 to the signal processing circuit 240 in accordance with a column drive signal from the column drive circuit 252.

The luminance circuit 360 is connected to the current-voltage conversion circuit 310, and generates a luminance signal Vcp according to the photocurrent from the photodiode 221 corresponding to each pixel.

The AD conversion circuit 370 as a current comparison circuit compares a luminance current Ipda by the luminance signal Vcp with a reference current Iref by a reference signal (reference voltage) Vref, and performs analogue-to-digital (AD) conversion on the luminance signal Vcp into a digital signal.

FIG. 7 is a circuit diagram illustrating a configuration example of the current-voltage conversion circuit 310, the luminance circuit 360, and the AD conversion circuit 370 in the first embodiment.

The current-voltage conversion circuit 310 includes a conversion transistor 311, a capacitor 312, a current source transistor 313, and a voltage supply transistor 314. As the conversion transistor 311 and the voltage supply transistors 314, for example, an N-type metal-oxide-semiconductor (MOS) transistor is used. Furthermore, as the current source transistor 313, for example, a P-type MOS transistor is used.

The conversion transistor 311 converts a photocurrent Ipd from the corresponding photodiode 221 into the voltage signal Vout, and outputs the voltage signal Vout from a gate. A source of the conversion transistor 311 is connected to a cathode of the photodiode 221 and a gate of the voltage supply transistor 314, via an input signal line 315. Furthermore, a drain of the conversion transistor 311 is connected to a high voltage source VDD via the luminance circuit 360, and the gate is connected to a drain of the current source transistor 313, a drain of the voltage supply transistor 314, and an input terminal of the buffer 320 via an output signal line 316.

The current source transistor 313 supplies a predetermined constant current to the output signal line 316. The predetermined bias voltage Vbias is applied to a gate of the current source transistor 313. A source is connected to the high voltage source VDD, and the drain is connected to the output signal line 316.

The voltage supply transistor 314 supplies a constant voltage according to the constant current from the output signal line 316 to the source of the conversion transistor 311 via the input signal line 315. Therefore, a source voltage of the conversion transistor 311 is fixed to the constant voltage. Therefore, when light enters, a gate-source voltage of the conversion transistor 311 increases according to the photocurrent Ipd, and a level of the voltage signal Vout increases.

One end of the capacitor 312 is connected to the gate of the conversion transistor 311 via the output signal line 316. Another end of the capacitor 312 is connected to the source of the conversion transistor 311 via the input signal line 315. The capacitor 312 functions as a capacitance that compensates for a phase delay of the voltage signal Vout. Note that, in addition to the capacitor 312, a capacitance element such as an inter-wiring capacitance or a transistor can also be used as the capacitance. In the current-voltage conversion circuit 310, the conversion transistor 311 and the voltage supply transistor 314 constitute a loop circuit. The loop circuit becomes a negative feedback circuit under a predetermined condition, and the voltage signal Vout may oscillate. The capacitor 312 compensates for a phase delay of the voltage signal Vout, and suppresses the oscillation of the loop circuit of the current-voltage conversion circuit 310 for stabilization.

The luminance circuit 360 includes a conversion transistor 361. As the conversion transistor 361, for example, a P-type MOS transistor is used. A source of the conversion transistor 361 is connected to the high voltage source VDD. A drain of the conversion transistor 361 is connected to the drain of the conversion transistor 311 and a gate of the conversion transistor 361. The gate of the conversion transistor 361 is connected to the drain of the conversion transistor 311 and the AD conversion circuit 370. The conversion transistor 361 generates a voltage according to the photocurrent Ipd flowing through the photodiode 221 as the luminance signal Vcp, and outputs the luminance signal Vcp from the gate of the conversion transistor 361.

The AD conversion circuit 370 includes a current source transistor 371, a reference current transistor 372, and a buffer 373.

As the current source transistor 371, for example, a P-type MOS transistor is used. As the reference current transistor 372, for example, an N-type MOS transistor is used. For example, a CMOS circuit is used for the buffer 373.

A source of the current source transistor 371 is connected to the high voltage source VDD. A drain of the current source transistor 371 is connected to a drain of the reference current transistor 372 and an input of the buffer 373. A gate of the current source transistor 371 is connected to the gate and the drain of the conversion transistor 361. As a result, the current source transistor 371 and the conversion transistor 361 constitute a current mirror circuit, and the current source transistor 371 causes a flow of the current Ipda corresponding to a predetermined mirror ratio with respect to the photocurrent Ipd. For example, the current Ipda is a current value proportional to the photocurrent Ipd.

The drain of the reference current transistor 372 is connected to the drain of the current source transistor 371 and the input of the buffer 373. A source of the reference current transistor 372 is connected to a low-voltage source (for example, ground). A gate of the reference current transistor 372 receives the reference voltage Vref. The reference voltage Vref is set to a predetermined value, but can be freely changed. The reference current transistor 372 causes a flow of the reference current Iref according to the reference voltage Vref.

The buffer 373 has the input connected to a node Nda between the current source transistor 371 and the reference current transistor 372, and outputs a voltage level of the node Nda as a digital signal from an output unit.

For example, in a case where the current Ipda is larger than the reference current Iref, the voltage at the node Nda becomes a high level voltage close to a voltage of the high voltage source VDD. Therefore, the AD conversion circuit 370 outputs a high-level ("1") digital signal from an output unit of the buffer 373. Whereas, in a case where the current Ipda is smaller than the reference current Iref, the voltage of the node Nda becomes a low level voltage close to a voltage (for example, a ground potential) of the low-voltage source. Therefore, the AD conversion circuit 370 outputs a low level ("0") digital signal from the output unit of the buffer 373. That is, the AD conversion circuit 370 compares the current Ipda corresponding to the photocurrent Ipd with the reference current Iref, and outputs the digital signal Vcm based on a magnitude relationship therebetween. As a result, the AD conversion circuit 370 can output the digital signals Vcm of mutually inverse logic depending on whether the luminance of the incident light is larger or smaller than the threshold value.

Figure 8:
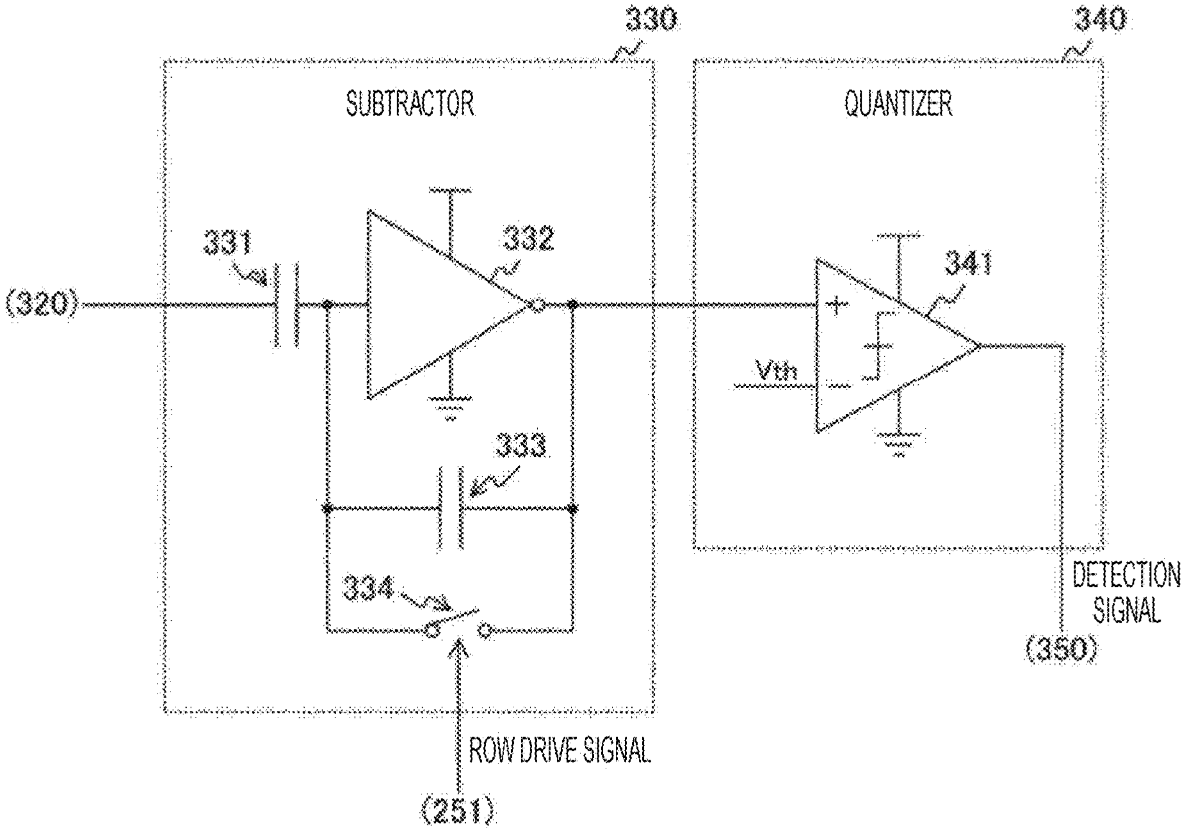
FIG. 8 is a circuit diagram illustrating a configuration example of a subtractor and a quantizer.

FIG. 8 is a circuit diagram illustrating a configuration example of the subtractor 330 and the quantizer 340. The subtractor 330 is provided with capacitors 331 and 333, an inverter 332, and a switch 334. Furthermore, the quantizer 340 is provided with a comparator 341.

One end of the capacitor 331 is connected to an output terminal of the buffer 320, and the other end thereof is connected to an input terminal of the inverter 332. The capacitor 333 is connected in parallel with the inverter 332. The switch 334 opens and closes a path connecting both ends of the capacitor 333 in accordance with a row drive signal.

The inverter 332 inverts a voltage signal input via the capacitor 331. The inverter 332 outputs the inverted signal to a non-inverting input terminal (+) of the comparator 341.

When the switch 334 is turned ON, a voltage Vinit is input to the buffer 320 side of the capacitor 331, and an opposite side becomes a virtual ground terminal. The potential of the virtual ground terminal is assumed to be zero for convenience. At this time, when a capacitance value of the capacitor 331 is C1, a charge Qinit accumulated in the capacitor 331 is expressed by the following expression. Whereas, since both ends of the capacitor 333 are short-circuited, the accumulated charge becomes zero.

$$Qinit = C1 \times Vinit \qquad \text{Expression 4}$$

Next, considering a case where the switch 334 is turned OFF and the voltage on the buffer 320 side of the capacitor 331 changes to Vafter, a charge Qafter accumulated in the capacitor 331 is expressed by the following expression.

$$Qafter = C1 \times Vafter \qquad \text{Expression 5}$$

Whereas, when a capacitance value of the capacitor 333 is C2 and an output voltage is Vout1, a charge Q2 accumulated in the capacitor 333 is expressed by the following formula.

$$Q2 = -C2 \times Vout1 \qquad \text{Expression 6}$$

At this time, since the total charge amounts of the capacitors 331 and 333 do not change, the following expression is satisfied.

$$Qinit = Qafter + Q2 \qquad \text{Expression 7}$$

When Expressions 4 to 6 are substituted into Expression 7 and transformed, the following expression is obtained.

$$Vout1 = -(C1/C2) \times (Vafter - Vinit) \qquad \text{Expression 8}$$

Expression 8 represents the subtraction operation of the voltage signal, and the gain of the subtraction result becomes C1/C2. Since it is generally desired to maximize the gain, it is preferable to design the capacitance value C1 larger and the capacitance value C2 smaller. Whereas, when C2 is too small, kTC noise increases, and noise characteristic may deteriorate. Therefore, capacitance reduction of C2 is limited within a range in which noise can be tolerated. Furthermore, since the address event detection circuit 300 including the subtractor 330 is mounted for every pixel, the capacitance values C1 and C2 have area restrictions. Although a possible range of the capacitance values C1 and C2 varies in proportion to a pixel size similarly to a capacitance value Cc, for example, the capacitance value C1 is set to a value of 20 to 200 femtofarads (fF) in normal design. The capacitance value C2 is set to a value of 1 to 20 femtofarads (fF).

The comparator 341 compares a voltage signal from the subtractor 330 with a predetermined threshold voltage Vth applied to an inverting input terminal (−). The comparator 341 outputs a signal indicating a comparison result to the transfer circuit 350 as a detection signal.

Note that, although the capacitors 331 and 333 are provided as the capacitive elements, a wiring capacitance, a transistor, or the like may be provided instead of these. Furthermore, types of the capacitive element having the capacitance value C1 and the capacitive element having the capacitance value C2 are desirably the same as each other because relative accuracy affects characteristics. Whereas, types of the capacitive element having the capacitance value Cc and the capacitive elements having the capacitance values C1 and C2 may be different from each other. For example, an inter-wiring capacitance may be used as the capacitive element of the capacitance value Cc, and a capacitor may be used as the capacitive elements of the capacitance values C1 and C2.

Figure 9:
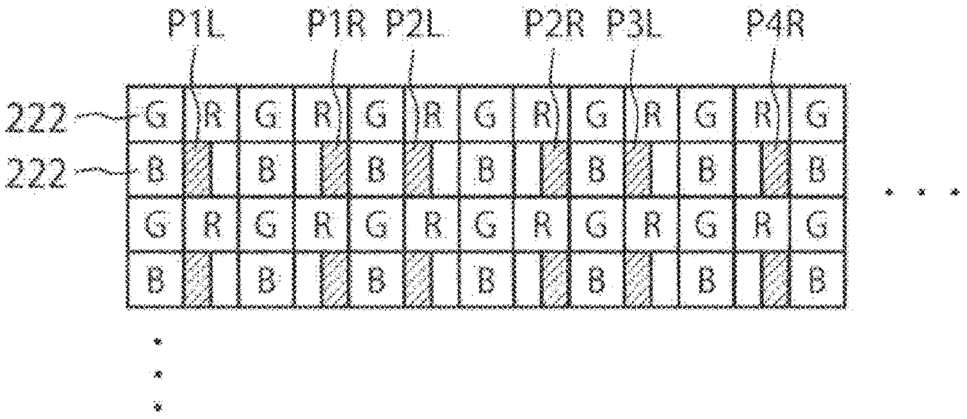
FIG. 9 is a plan view illustrating an array of a plurality of pixels in a light reception unit.

FIG. 9 is a plan view illustrating an array of a plurality of pixels in the light reception unit 220. Each pixel 222 includes the photodiode 221, and photoelectrically converts incident light to generate a current. For example, the pixels 222 (hereinafter, also referred to as normal pixels 222) of R (Red), G (Green), and B (Blue) photoelectrically convert incident light corresponding to the respective colors. The normal pixels 222 of RGB are not shielded from light, and receive incident light of the respective colors of RGB on the entire surface to perform photoelectric conversion. Therefore, the normal pixel 222 of R photoelectrically converts red light, the normal pixel 222 of G photoelectrically converts green light, and the normal pixel 222 of B photoelectrically converts blue light.

A first pixel PnL (n is a positive integer) has a light-shielded part on one side, and photoelectrically converts incident light from an exception part to generate a first current. For example, about half of the first pixel PnL on the left side is shielded from light, and the first pixel PnL photoelectrically converts incident light from about half on the right side.

A second pixel PnR has a light-shielded part on a side opposite to the light-shielding part of the first pixel PnL, and photoelectrically converts incident light from an exception part to generate a second current. For example, about half of the second pixel PnR on the right side is shielded from light, and the second pixel PnR photoelectrically converts incident light from about half on the left side.

The first pixel PnL and the second pixel PnR are arranged adjacent to the normal pixel 222, and are alternately arranged substantially evenly. For example, a second pixel PIR is arranged next to a first pixel P1L with the pixel 222 of B (Blue) interposed therebetween. A first pixel P2L is arranged next to the second pixel P1R with another pixel 222 of B (Blue) interposed therebetween. As described above, the first pixel PnL and the second pixel PnR are alternately arranged substantially evenly, such as the first pixel PIL, the second pixel PIR, the first pixel P2L, a second pixel P2R, a first pixel P3L, a second pixel P3R, a first pixel P4L, a second pixel P4R, . . . . Furthermore, the normal pixels 222 of RGB are also substantially evenly arranged together with the first and second pixels PnL and PnR.

Although not illustrated, the current-voltage conversion circuit 310, the luminance circuit 360, and the AD conversion circuit 370 in FIG. 7 are provided individually corresponding to the first pixel PnL and the second pixel PnR. The current-voltage conversion circuit 310, the luminance circuit 360, and the AD conversion circuit 370 corresponding to the first pixel PnL are referred to as a first current-voltage conversion circuit 310, a first luminance circuit 360, and a first AD conversion circuit 370 for convenience. The current-voltage conversion circuit 310, the luminance circuit 360, and the AD conversion circuit 370 corresponding to the second pixel PnR are referred to as a second current-voltage conversion circuit 310, a second luminance circuit 360, and a second AD conversion circuit 370 for convenience. Note that the first and second current-voltage conversion circuits 310, the first and second luminance circuits 360, and the first and second AD conversion circuits 370 individually corresponding to the first pixel PnL and the second pixel PnR overlap with those in FIG. 7, and thus illustration thereof is omitted.

The first current-voltage conversion circuit 310 is provided corresponding to each of the plurality of first pixels PnL, and generates a first voltage signal according to the photocurrent Ipd flowing through the corresponding first pixel PnL. The second current-voltage conversion circuit 310 is provided corresponding to each of the plurality of second pixels PnR, and generates a second voltage signal according to the photocurrent Ipd flowing through the corresponding second pixel PnR.

Internal configurations of the first and second current-voltage conversion circuits 310 are the same as each other, and are as described with reference to FIG. 7. That is, the first current-voltage conversion circuit 310 includes a first conversion transistor 311, a first current source transistor 313, and a first voltage supply transistor 314. The first conversion transistor 311 converts the photocurrent Ipd into the output signal Vout, and outputs the output signal Vout from the gate. The first current source transistor 313 supplies a predetermined constant current to a first output signal line 316 connected to the gate of the first conversion transistor 311. The first voltage supply transistor 314 supplies a constant voltage according to the predetermined constant current from the first output signal line 316 to the source of the first conversion transistor 311.

Furthermore, the second current-voltage conversion circuit 310 includes a second conversion transistor 311, a second current source transistor 313, and a second voltage supply transistor 314. The second conversion transistor 311 converts the photocurrent Ipd into the output signal Vout and outputs the output signal Vout from the gate. The second current source transistor 313 supplies a predetermined constant current to a second output signal line 316 connected to the gate of the second conversion transistor 311. The second voltage supply transistor 314 supplies a constant voltage according to the predetermined constant current from the second output signal line 316 to the source of the second conversion transistor 311.

As a result, the first and second power-supply voltage conversion circuits 310 can output the voltage signal Vout according to each photocurrent Ipd.

The first luminance circuit 360 is provided corresponding to each of the plurality of first pixels PnL, and generates a first luminance signal Vcp according to the photocurrent Ipd flowing through the corresponding first pixel PnL. The second luminance circuit 360 is provided corresponding to each of the plurality of second pixels PnR, and generates a second luminance signal Vcp according to the photocurrent Ipd flowing through the corresponding second pixel PnR.

The first luminance circuit 360 includes a third conversion transistor 361 that converts the photocurrent Ipd into the luminance signal Vcp and outputs the luminance signal Vcp from a gate. As a result, the first luminance circuit 360 is provided corresponding to each of the plurality of first pixels PnL, and generates the first luminance signal Vcp according to the photocurrent Ipd flowing through the corresponding first pixel PnL. The second luminance circuit 360 includes a fourth conversion transistor 361 that converts the photocurrent Ipd into the luminance signal Vcp and outputs the luminance signal Vcp from a gate. The second luminance circuit 360 is provided corresponding to each of the plurality of second pixels PnR, and generates the second luminance signal Vcp according to the photocurrent Ipd flowing through the corresponding second pixel PnR.

The first AD conversion circuit 370 includes a third current source transistor 371, a first reference current transistor 372, and a first buffer 373. The third current source transistor 371 is connected between the high voltage source VDD and the output unit, and a gate thereof is connected to the gate of the third conversion transistor 361. As a result, the third current source transistor 371 causes a flow of the current Ipda according to the photocurrent Ipd. The first reference current transistor 372 is connected between the output unit and the low-voltage source GND, and a gate thereof receives the reference signal Vref. As a result, the first reference current transistor 372 causes a flow of the reference current Iref according to the reference signal Vref. The first AD conversion circuit 370 is provided corresponding to each of the plurality of first pixels PnL, compares the current Ipda according to the first luminance signal Vcp with the current Iref according to the reference signal Vref, and can perform AD conversion of the first luminance signal Vcp into a first digital signal Vcm.

The first buffer 373 is connected to the node Nda of the first AD conversion circuit 370, and outputs the digital signal Vcm.

The second AD conversion circuit 370 includes a fifth current source transistor 371 and a second reference current transistor 372. The fifth current source transistor 371 is connected between the high voltage source VDD and the output unit, and a gate thereof is connected to the gate of the fourth conversion transistor 361. As a result, the fifth current source transistor 371 causes a flow of the current Ipda according to the photocurrent Ipd. The second reference current transistor 372 is connected between the output unit and the low-voltage source GND, and a gate thereof receives the reference signal Vref. The reference signal Vref is the same as the reference signal Vref received by the first reference current transistor 372. As a result, the second reference current transistor 372 causes a flow of the reference current Iref according to the reference signal Vref. The second AD conversion circuit 370 is provided corresponding to each of the plurality of second pixels PnR, compares the current Ipda according to the second luminance signal Vcp with the current Iref according to the reference signal Vref, and can perform AD conversion of the second luminance signal Vcp into a second digital signal Vcm.

A second buffer 373 is connected to the node Nda of the second AD conversion circuit 370, and outputs the digital signal Vcm.

Since the half on the left side of the first pixel PnL is shielded from light, the first pixel PnL photoelectrically converts incident light from the half on the right side. Since the half portion on the right side of the second pixel PnR is shielded from light, the second pixel PnR photoelectrically converts incident light from the half on the left side. Note that the first and second pixels PnL and PnR may be pixels having no color filter, or may be pixels receiving the same color of any one of R, G, and B. The photodetection device 200 according to the present embodiment executes the image plane phase difference AF processing by using luminance signals from the first and second pixels PnL and PnR.

Figure 10A:
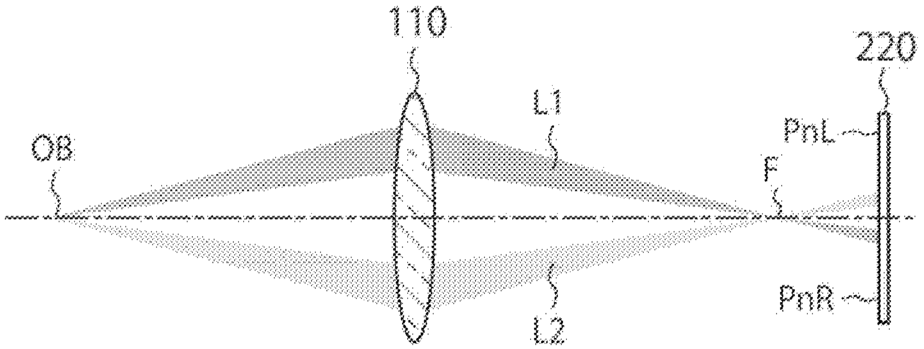
FIG. 10A is a view illustrating image plane phase difference AF processing according to the first embodiment.
Figure 10B:
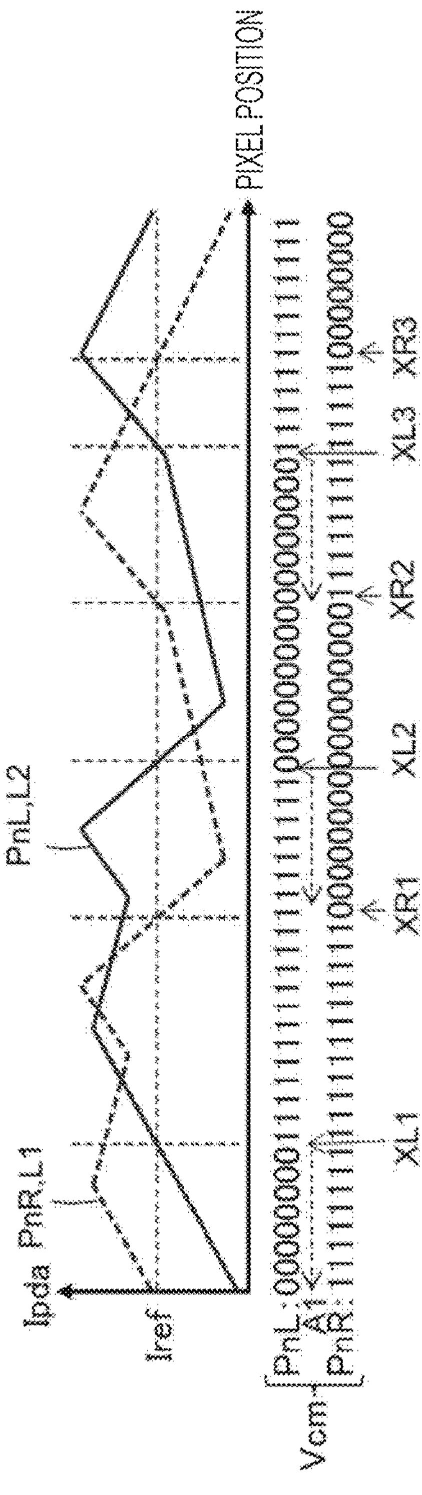
FIG. 10B is a view illustrating the image plane phase difference AF processing according to the first embodiment.
Figure 11A:
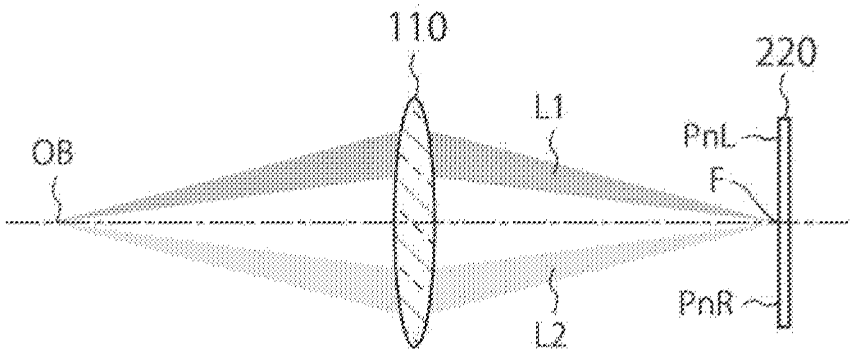
FIG. 11A is a view illustrating the image plane phase difference AF processing according to the first embodiment.
Figure 11B:
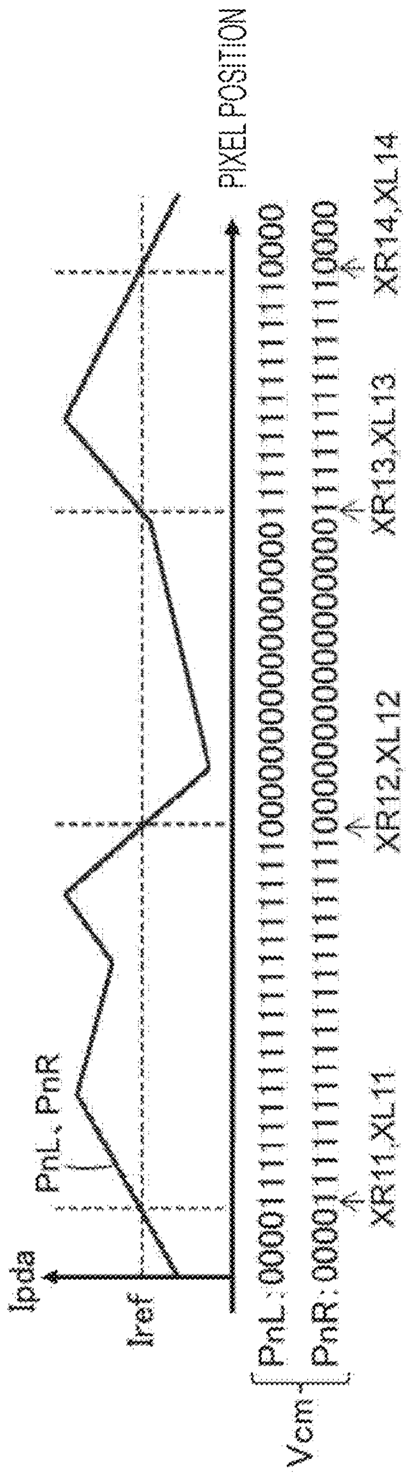
FIG. 11B is a view illustrating the image plane phase difference AF processing according to the first embodiment.
Figure 12A:
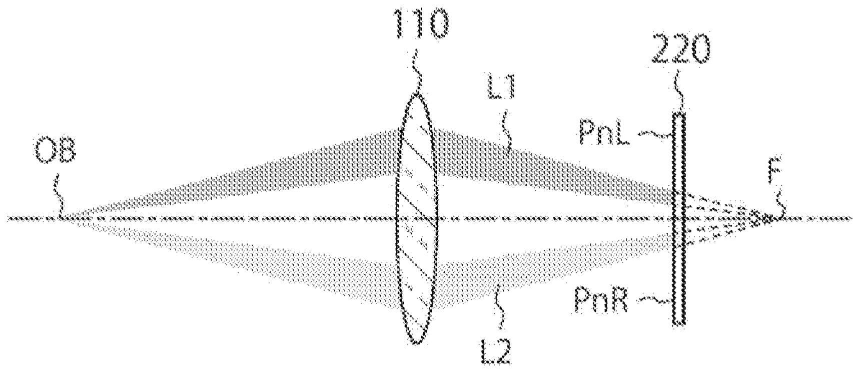
FIG. 12A is a view illustrating the image plane phase difference AF processing according to the first embodiment.
Figure 12B:
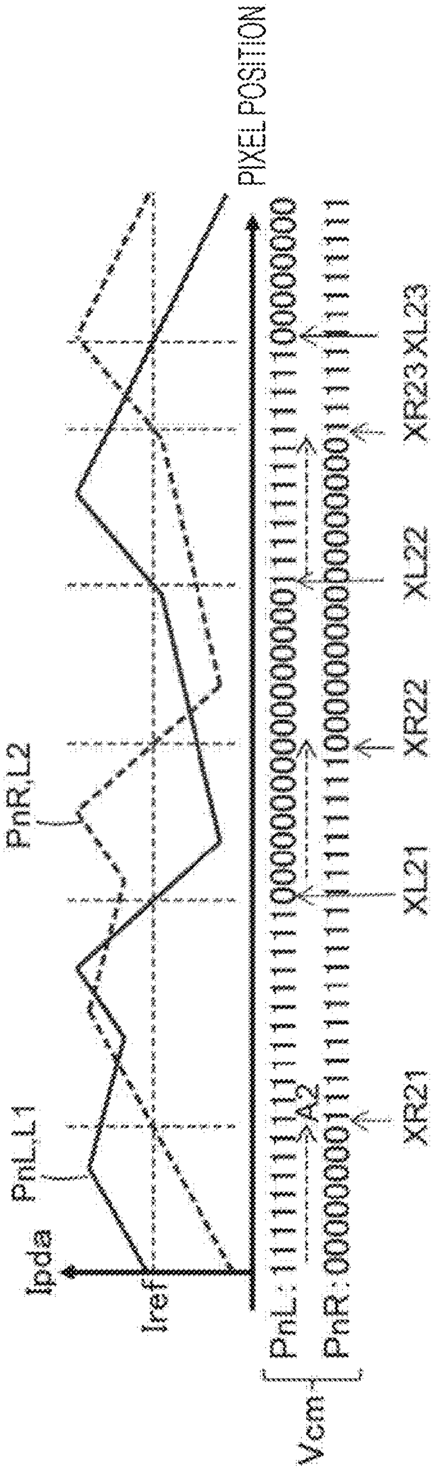
FIG. 12B is a view illustrating the image plane phase difference AF processing according to the first embodiment.

FIGS. 10A to 12B are views illustrating the image plane phase difference AF processing according to the first embodiment. FIGS. 10A, 11A, and 12A are conceptual views illustrating a positional relationship between an imaging object OB, the imaging lens 110, a focal position F, and the light reception unit 220. FIGS. 10B, 11B, and 12B are graphs illustrating a relationship between positions of the first and second pixels PnL and PnR and the current Ipda proportional to the photocurrent Ipd. The digital signal Vcm in FIGS. 10B, 11B, and 12B illustrates the digital signal Vcm of the first pixel PnL in the upper part and the digital signal Vcm of the second pixel PnR in the lower part.

FIGS. 10A and 10B illustrate a case (front-pin state) where the focal position F is located closer to the imaging lens 110 side than the light receiving surface of the light reception unit 220. Incident light L1 is incident light passing through one side of the imaging lens 110, and incident light L2 is incident light passing through another side of the imaging lens 110. In a case of the front-pin state, the incident light L1 passes through the focal position F and enters the second pixel PnR. The incident light L2 passes through the focal position F and enters the first pixel PnL. Therefore, as illustrated in FIG. 10A, beams of the incident light L1 and L2 pass through the focal position F, are inverted from each other, and enter the light reception unit 220. As a result, as illustrated in FIG. 10B, the current Ipda of the incident light L1 is detected by the second pixel PnR. The current Ipda of the incident light L2 is detected by the first pixel PnL. Since the current Ipda is a current proportional to the photocurrent Ipd at a predetermined mirror ratio, the current Ipda substantially indicates the photocurrent Ipd (luminance).

Here, the first luminance circuit 360 generates the first luminance signal Vcp according to the photocurrent Ipd of the first pixel PnL. The first AD conversion circuit 370 receives the first luminance signal Vcp, generates the current Ipda proportional to the photocurrent Ipd, and compares the current Ipda with the reference current Iref. The first AD conversion circuit 370 outputs the digital signal Vcm according to a magnitude relationship between the current Ipda and the reference current Iref. For example, in a case where the current Ipda is larger than the reference current Iref, the first AD conversion circuit 370 outputs a high level voltage (for example, “1”) as the digital signal Vcm from the output unit. In a case where the current Ipda is smaller than the reference current Iref, the first AD conversion circuit 370 outputs a low level voltage (for example, “0”) as the digital signal Vcm from the output unit.

The second luminance circuit 360 generates the second luminance signal Vcp according to the photocurrent Ipd of the second pixel PnR. The second AD conversion circuit 370 receives the second luminance signal Vcp, generates the current Ipda proportional to the photocurrent Ipd, and compares the current Ipda with the reference current Iref. The second AD conversion circuit 370 outputs the digital signal Vcm according to a magnitude relationship between the current Ipda and the reference current Iref. For example, in a case where the current Ipda is larger than the reference current Iref, the second AD conversion circuit 370 outputs a high level voltage (for example, “1”) as the digital signal Vcm from the output unit. In a case where the current Ipda is smaller than the reference current Iref, the second AD conversion circuit 370 outputs a low level voltage (for example, “0”) as the digital signal Vcm from the output unit.

In this manner, the first and second AD conversion circuits 370 can output the digital signal Vcm according to the current Ipda according to the photocurrent Ipd of the first and second pixels PnL and PnR, respectively. The digital signal Vcm in FIG. 10B illustrates the digital signal Vcm of the first pixel PnL in the upper part and the digital signal Vcm of the second pixel PnR in the lower part. The digital signals Vcm of the first and second pixels PnL and PnR adjacent to each other are illustrated at the same pixel position in the upper and lower parts, respectively. For example, at the initial pixel position, since the current Ipda of the first pixel PnL that has received the incident light L2 is smaller than the reference current Iref, the digital signal Vcm from the first AD conversion circuit 370 corresponding to the first pixel PnL is “0”. Since the current Ipda of the second pixel PnR that has received the incident light L1 is larger than the reference current Iref, the digital signal Vcm from the second AD conversion circuit 370 corresponding to the second pixel PnR is “1”.

When the current Ipda of the first pixel PnL that receives the incident light L2 exceeds the reference current Iref at a pixel position XL1, the digital signal Vcm from the first AD conversion circuit 370 corresponding to the first pixel PnL changes from “0” to “1”.

When the current Ipda of the second pixel PnR that receives the incident light L1 falls below the reference current Iref at a pixel position XR1, the digital signal Vcm from the second AD conversion circuit 370 corresponding to the second pixel PnR changes from “1” to “0”.

When the current Ipda of the first pixel PnL that receives the incident light L2 falls below the reference current Iref at a pixel position XL2, the digital signal Vcm from the first AD conversion circuit 370 corresponding to the first pixel PnL changes from “1” to “0”.

When the current Ipda of the second pixel PnR that receives the incident light L1 exceeds the reference current Iref at a pixel position XR2, the digital signal Vcm from the second AD conversion circuit 370 corresponding to the second pixel PnR changes from “0” to “1”.

When the current Ipda of the first pixel PnL that receives the incident light L2 exceeds the reference current Iref at the pixel position XL3, the digital signal Vcm from the first AD conversion circuit 370 corresponding to the first pixel PnL changes from “0” to “1”.

When the current Ipda of the second pixel PnR that receives the incident light L1 falls below the reference current Iref at a pixel position XR3, the digital signal Vcm from the second AD conversion circuit 370 corresponding to the second pixel PnR changes from “1” to “0”.

As described above, in a case where the focal position F is shifted from the light receiving surface of the light reception unit 220, the pixel position where the digital signal Vcm changes is different (shifted) between the first pixel PnL and the second pixel PnR.

FIGS. 11A and 11B illustrate a case (in-focus state) where the focal position F is located on the light receiving surface of the light reception unit 220. In a case of the in-focus state, both the incident lights L1 and L2 enter the first and second pixels PnL and PnR. As a result, as illustrated in FIG. 11B, the currents Ipda of the incident light L1 and L2 are detected by both the first and second pixels PnL and PnR.

In this case, the currents Ipda are substantially equal between the first and second pixels PnL and PnR. The currents Ipda of the first and second pixels PnL and PnR do not substantially change depending on the pixel position.

For example, at the initial pixel position, since the currents Ipda of the first and second pixels PnL and PnR that have received the incident light L1 and L2 are smaller than the reference current Iref, the digital signals Vcm from the first and second AD conversion circuits 370 corresponding to the first and second pixels PnL and PnR are both “0”.

At pixel positions XL11 and XR11, since the currents Ipda of the first and second pixels PnL and PnR exceed the reference current Iref, the digital signals Vcm from the first and second AD conversion circuits 370 corresponding to the first and second pixels PnL and PnR both change from “0” to “1”.

At pixel positions XL12 and XR12, since the currents Ipda of the first and second pixels PnL and PnR fall below the reference current Iref, the digital signals Vcm from the first and second AD conversion circuits 370 corresponding to the first and second pixels PnL and PnR both change from “1” to “0”.

Similarly, at pixel positions XL13 and XR13, the digital signals Vcm from the first and second AD conversion circuits 370 corresponding to the first and second pixels PnL and PnR both change from “0” to “1”. At pixel positions XL14 and XR14, the digital signals Vcm from the first and second AD conversion circuits 370 corresponding to the first and second pixels PnL and PnR both change from “1” to “0”.

FIGS. 12A and 12B illustrate a case (rear-pin state) in which the focal position F is located on an opposite side of the imaging lens 110 with respect to the light receiving surface of the light reception unit 220. In a case of the rear-pin state, the incident light L1 passes through the focal position F and enters the first pixel PnL. The incident light L2 passes through the focal position F and enters the second pixel PnR. Therefore, as illustrated in FIG. 12A, beams of the incident light L1 and L2 pass through the focal position F and enter the light reception unit 220 in a non-inverted state. As a result, as illustrated in FIG. 12B, the current Ipda of the incident light L1 is detected by the first pixel PnL. The current Ipda of the incident light L2 is detected by the second pixel PnR.

In this case, for example, at the initial pixel position, since the current Ipda of the first pixel PnL that has received the incident light L1 is larger than the reference current Iref, the digital signal Vcm from the first AD conversion circuit 370 corresponding to the first pixel PnL is “1”. Since the current Ipda of the second pixel PnR that has received the incident light L2 is smaller than the reference current Iref, the digital signal Vcm from the second AD conversion circuit 370 corresponding to the second pixel POR is “0”.

When the current Ipda of the second pixel PnR that receives the incident light L2 exceeds the reference current Iref at a pixel position XR21, the digital signal Vcm from the second AD conversion circuit 370 corresponding to the second pixel PnR changes from “0” to “1”.

When the current Ipda of the first pixel PnL that receives the incident light L1 falls below the reference current Iref at a pixel position XL21, the digital signal Vcm from the first AD conversion circuit 370 corresponding to the first pixel PnL changes from “1” to “0”.

When the current Ipda of the second pixel PnR that receives the incident light L2 falls below the reference current Iref at a pixel position XR22, the digital signal Vcm from the second AD conversion circuit 370 corresponding to the second pixel PnR changes from “1” to “0”.

When the current Ipda of the first pixel PnL that receives the incident light L1 exceeds the reference current Iref at a pixel position XL22, the digital signal Vcm from the first AD conversion circuit 370 corresponding to the first pixel PnL changes from “0” to “1”.

When the current Ipda of the second pixel PnR that receives the incident light L2 exceeds the reference current Iref at a pixel position XR23, the digital signal Vcm from the second AD conversion circuit 370 corresponding to the second pixel PnR changes from “0” to “1”.

When the current Ipda of the first pixel PnL that receives the incident light L1 falls below the reference current Iref at a pixel position XL23, the digital signal Vcm from the first AD conversion circuit 370 corresponding to the first pixel PnL changes from “1” to “0”.

As described above, in a case where the focal position F is shifted from the light receiving surface of the light reception unit 220, the pixel position where the digital signal Vcm changes is different (shifted) between the first pixel PnL and the second pixel PnR.

Referring to FIGS. 10B and 12B, shift directions of the digital signal Vcm in the front-pin state and the rear-pin state are opposite to each other. For example, in a case of the front-pin state, the digital signal Vcm of the second pixel PnR is shifted from the digital signal Vcm of the first pixel PnL in a direction indicated by a dashed arrow A1 in FIG. 10A. A relative shift amount between the digital signal Vcm of the first pixel PnL and the digital signal Vcm of the second pixel PnR is eight digits. For example, in a case of the rear-pin state, the digital signal Vcm of the first pixel PnL is shifted from the digital signal Vcm of the second pixel PnR in a direction indicated by a dashed arrow A2 in FIG. 12A. A relative shift amount between the digital signal Vcm of the first pixel PnL and the digital signal Vcm of the second pixel PnR is eight digits.

As described above, the shift direction of the digital signals Vcm of the first and second pixels PnL and PnR indicates the shift direction of the focal position F with respect to the light receiving surface of the light reception unit 220, and the shift amount of the digital signal Vcm indicates the shift amount of the focal position F with respect to the light receiving surface of the light reception unit 220.

Therefore, in a case of the front-pin state illustrated in FIG. 10A, the control unit 130 moves the imaging lens 110 or the light reception unit 220 so as to reduce a distance between the imaging lens 110 and the light reception unit 220 in accordance with the shift direction A1 of the digital signals Vcm of the first and second pixels PnL and PnR. At this time, the control unit 130 moves the imaging lens 110 or the light reception unit 220 by a predetermined distance according to the shift amount (for example, eight digits) of the digital signals Vcm of the first and second pixels PnL and PnR. As a result, the control unit 130 adjusts the focal position F so that the digital signals of the first and second pixels PnL and PnR become substantially identical. As a result, as illustrated in FIGS. 11A and 11B, the control unit 130 can adjust the focal position F to the light receiving surface of the light reception unit 220, and can set the front-pin state of the photodetection device 200 to the in-focus state.

In a case of the rear-pin state illustrated in FIG. 12A, the control unit 130 moves the imaging lens 110 or the light reception unit 220 so as to increase a distance between the imaging lens 110 and the light reception unit 220 in accordance with the shift direction A2 of the digital signals Vcm of the first and second pixels PnL and PnR. At this time, the control unit 130 moves the imaging lens 110 or the light reception unit 220 by a predetermined distance according to the shift amount (for example, eight digits) of the digital signals Vcm of the first and second pixels PnL and PnR. As a result, the control unit 130 adjusts the focal position F so that the digital signals of the first and second pixels PnL and PnR become substantially identical. As a result, as illustrated in FIGS. 11A and 11B, the control unit 130 can adjust the focal position F to the light receiving surface of the light reception unit 220, and can set the rear-pin state of the photodetection device 200 to the in-focus state.

A correspondence between the shift direction (A1 or A2) of the digital signal Vcm and the movement direction of the imaging lens 110 or the light reception unit 220 is known in advance. Therefore, information about the correspondence may simply be stored in advance in a memory 131 in the control unit 130 illustrated in FIG. 1. Furthermore, a correspondence between the shift amount of the digital signal Vcm (the number of digits of the digital value) and the movement distance of the imaging lens 110 or the light reception unit 220 is also known in advance. Therefore, information about the correspondence may also simply be stored in the memory 131 in advance.

As a result, the movement direction and the movement distance of the imaging lens 110 or the light reception unit 220 are uniquely determined according to the shift direction and the shift amount of the digital signals Vcm of the first and second pixels PnL and PnR. Therefore, the control unit 130 does not need to move the position of the imaging lens 110 or the light reception unit 220 by trial and error in order to specify the position of the in-focus state, and can specify the position of the in-focus state in a short time.

As described above, in the imaging device 100 according to the present embodiment, the first pixel PnL in which the half on one side is shielded from light and the second pixel PnR in which the half on another side is shielded from light are arranged adjacent to each other, and the focal position F of the incident light is adjusted on the basis of the digital signal Vcm corresponding to the photocurrent Ipd from each of the first and second pixels PnL and PnR. At this time, the control unit 130 determines the shift direction and the shift amount of the focal position F on the basis of an array of the digital signals Vcm from the first pixel PnL and an array of the digital signals Vcm from the second pixel PnR. The shift direction and the shift amount of the focal position F can be uniquely determined by the relative shift direction (A1 or A2) and the shift amount (the number of digits of the digital signal Vcm) between the array of the digital signals Vcm from the first pixel PnL and the array of the digital signals Vcm from the second pixel PnR. The control unit 130 can adapt the focal position F to the light receiving surface of the light reception unit 220 by adjusting the focal position so that the array of the digital signals Vcm from the first pixel PnL and the array of the digital signals Vcm from the second pixel PnR are substantially identical. As a result, the control unit 130 can easily focus the incident light on the light receiving surface of the light reception unit 220. That is, according to the present embodiment, the image plane phase difference method AF function can be easily applied to the EVS.

Furthermore, according to the present embodiment, the luminance circuit 360 that outputs the luminance signal Vcp from the photocurrent Ipd and the AD conversion circuit 370 that performs AD conversion on the luminance signal Vcp to generate the digital signal Vcm are provided separately from the current-voltage conversion circuit 310. As a result, the photodetection device 200 can execute the image plane phase difference AF function simultaneously with the operation of the EVS. Moreover, in the photodetection device 200, even in a case where no event of a luminance change occurs in the EVS, the luminance circuit 360 and the AD conversion circuit 370 can execute the image plane phase difference AF function.

Modification

In the embodiment described above, the reference voltage Vref in FIG. 7 may be a predetermined voltage set in advance. However, the reference voltage Vref may not be appropriate, such as a case where the current Ipda is always lower than the reference current Iref or a case where the current Ipda is always higher than the reference current Iref. In this case, the digital signal Vcm illustrated in FIGS. 10B, 11B, and 12B is all "0" or all "1" in both the first and second pixels PnL and PnR. Therefore, the control unit 130 cannot execute the image plane phase difference AF function.

Therefore, in the present modification, the reference voltage Vref is made variable. The control unit 130 changes the reference voltage Vref stepwise or the reference voltage Vref continuously to adjust the reference current Iref.

Figure 12C:
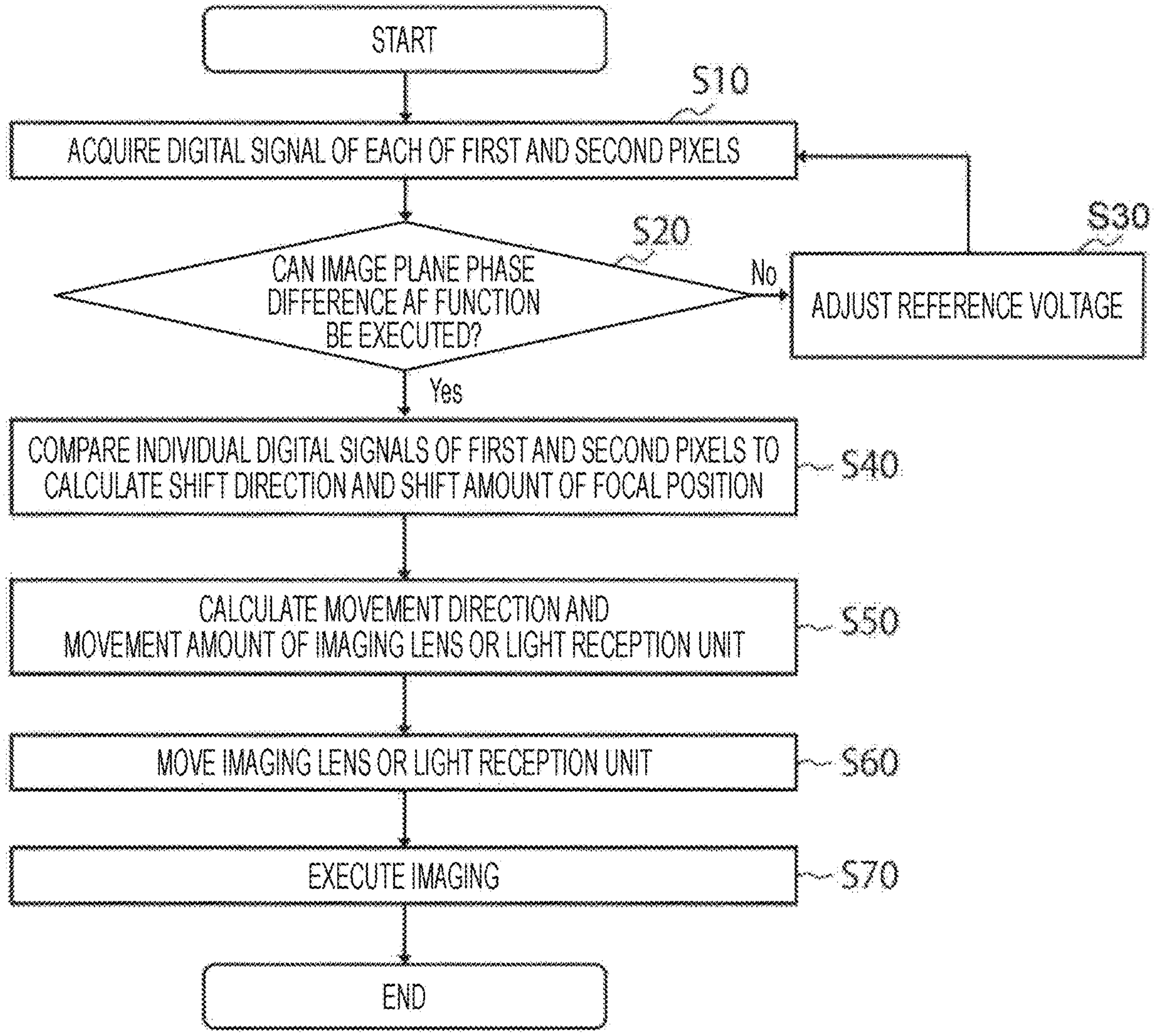
FIG. 12C is a flowchart illustrating an operation of a photodetection device according to a modification.

For example, FIG. 12C is a flowchart illustrating an operation of the photodetection device 200 according to the modification.

First, as in the embodiment described above, the signal processing circuit 240 acquires the digital signal Vcm of each of the first and second pixels PnL and PnR (S10).

Next, the control unit 130 determines whether the image plane phase difference AF function can be executed using the array of the digital signals Vcm (S20). For example, in a case where the digital signal Vcm is biased to one logic in the first and second pixels PnL and PnR, the control unit 130 sets the reference voltage Vref such that a ratio of "0" and "1" in the array of the digital signals Vcm is approximately half. Of course, the ratio of "0" and "1" in the digital signal Vcm is not limited to half, and may be a ratio in a predetermined range.

In a case where the image plane phase difference AF function cannot be executed (NO in S20), the control unit 130 adjusts the reference voltage Vref (S30). A changing direction of the reference voltage Vref is determined on the basis of the digital signal Vcm. For example, in a case where the digital signal Vcm is biased to "0", it is determined that the reference current Iref is too high, and the control unit 130 decreases the reference voltage Vref. Whereas, in a case where the digital signal Vcm is biased to "1", it is determined that the reference current Iref is too low, and the control unit 130 increases the reference voltage Vref. In this manner, the reference voltage Vref is adjusted, and steps S10 and S20 are executed again.

In a case where the image plane phase difference AF function can be executed (YES in S20), the control unit 130 executes the image plane phase difference AF function described above. That is, the control unit 130 compares the individual arrays of the digital signals Vcm of the first and second pixels PnL and PnR, to calculate the shift direction and the shift amount of the focal position F (S40). Next, the control unit 130 calculates the movement direction and the movement amount of the imaging lens 110 or the light reception unit 220 on the basis of the shift direction and the shift amount of the focal position F (S50). Next, the control unit 130 moves the imaging lens 110 or the light reception unit 220 in accordance with the calculated movement direction and movement amount (S60). As a result, the focal position F is adapted to the light receiving surface of the light reception unit 220.

Then, the photodetection device 200 executes imaging as usual (S70).

As described above, according to the present modification, the photodetection device 200 can appropriately execute the image plane phase difference AF function after appropriately adjusting the reference voltage Vref.

Second Embodiment

Figure 13:
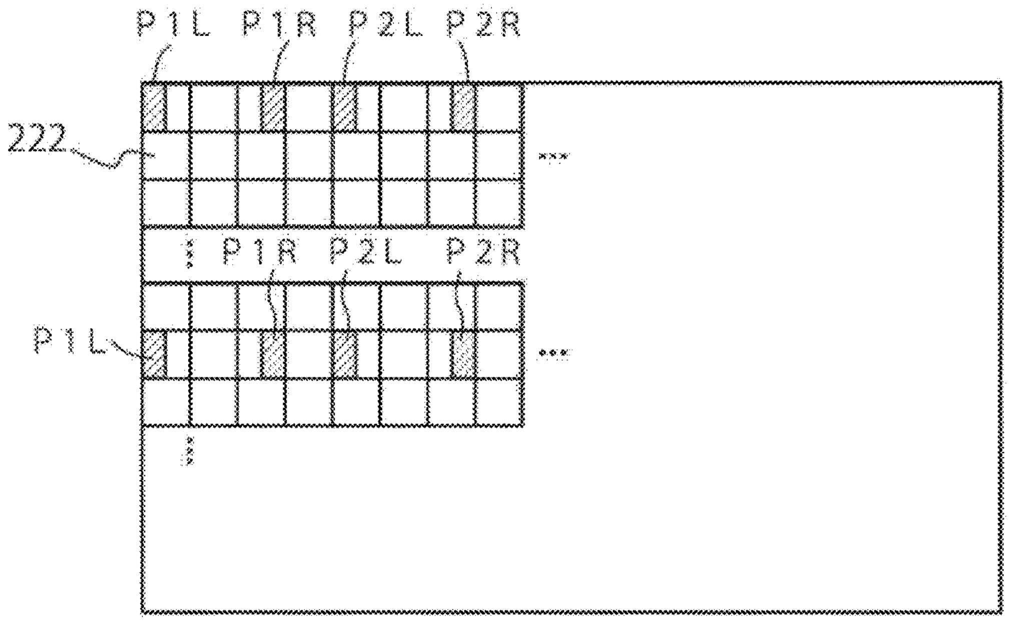
FIG. 13 is a plan view illustrating an array of a first pixel, a second pixel, and a normal pixel of a light reception unit according to a second embodiment.

FIG. 13 is a plan view illustrating an array of a first pixel PnL, a second pixel PnR, and a normal pixel 222 of a light reception unit 220 according to a second embodiment. The first and second pixels PnL and PnR are alternately and substantially evenly arranged in any pixel row intermittently. As illustrated in FIG. 13, the adjacent first and second pixels PnL and PnR may be adjacent to each other with the normal pixel 222 interposed therebetween, or may be adjacent to each other so as to be in contact with each other.

Even if the array of the first and second pixels PnL and PnR is intermittently provided in any pixel row, the image plane phase difference AF function described with reference to FIGS. 10A to 12B can be executed using the pixel row.

Although not illustrated, the first and second pixels PnL and PnR may be alternately and substantially evenly arranged in any pixel column intermittently.

Other configurations of the second embodiment may be similar to those of the first embodiment. Therefore, the second embodiment can obtain the effects similar to those of the first embodiment.

Note that the manner of arraying the first and second pixels PnL and PnR is not limited to FIG. 13, and may be any manner as long as the array of the digital signals Vcm illustrated in FIGS. 10B, 11B, and 12B can be obtained.

Third Embodiment

Figure 14:
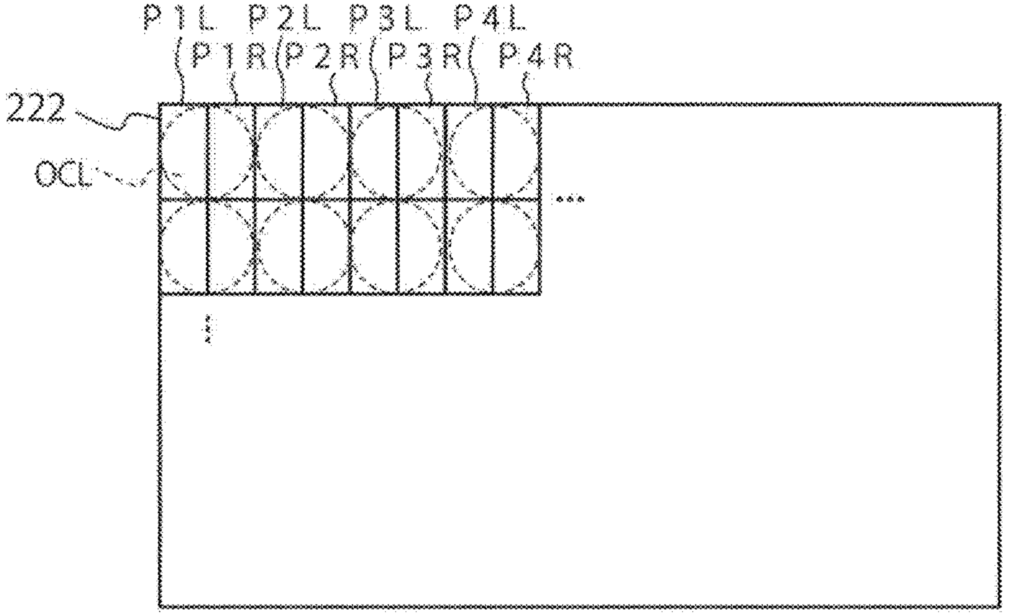
FIG. 14 is a plan view illustrating an array of a first pixel, a second pixel, and a normal pixel of a light reception unit according to a third embodiment.

FIG. 14 is a plan view illustrating an array of a first pixel PnL, a second pixel PnR, and a normal pixel 222 of a light reception unit 220 according to a third embodiment. In the third embodiment, the first and second pixels PnL and PnR adjacent to each other and the normal pixel 222 are formed by the same pixel. Therefore, substantially half on one side of the normal pixel 222 is used as the first pixel PnL, and substantially half on another side of the normal pixel 222 is used as the second pixel PnR. In a case of using as the normal pixel 222, the normal pixel 222 photoelectrically converts incident light received on the entire surface.

An on-chip lens OCL is provided corresponding to each normal pixel 222. Therefore, the first and second pixels PnL and PnR adjacent to each other provided in one normal pixel 222 correspond to one on-chip lens OCL.

As a result, the normal pixel 222 can also function as a pixel that detects each color of RGB, and can also be used for the image plane phase difference AF function as the first and second pixels PnL and PnR. For example, first, the normal pixel 222 is used for the image plane phase difference AF function as the first and second pixels PnL and PnR. After execution of the image plane phase difference AF function, the normal pixel 222 is used as an EVS for imaging processing.

Fourth Embodiment

Figure 15:
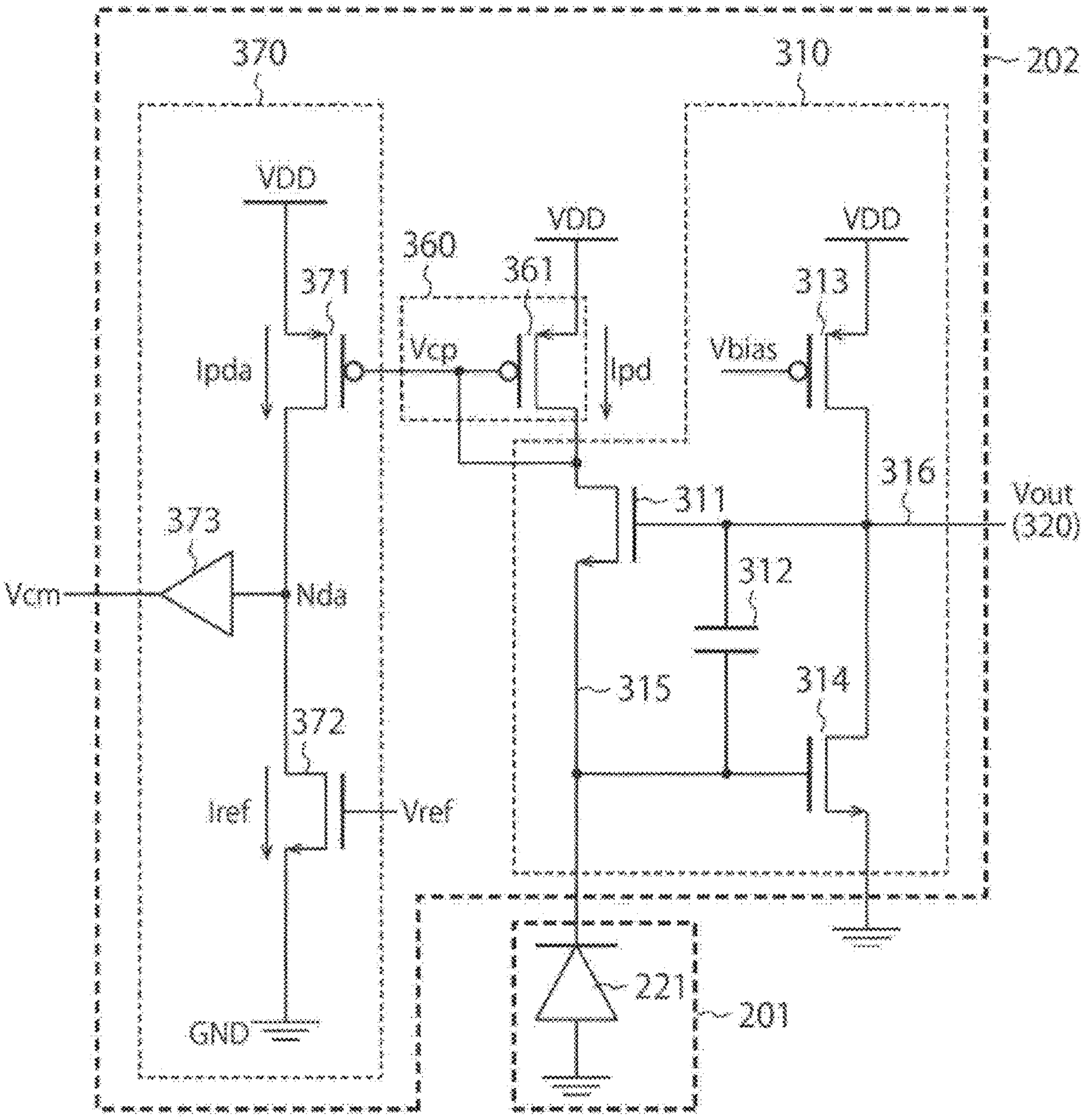
FIG. 15 is a circuit diagram illustrating a configuration example of a photodetection device according to a fourth embodiment.
Figure 16:
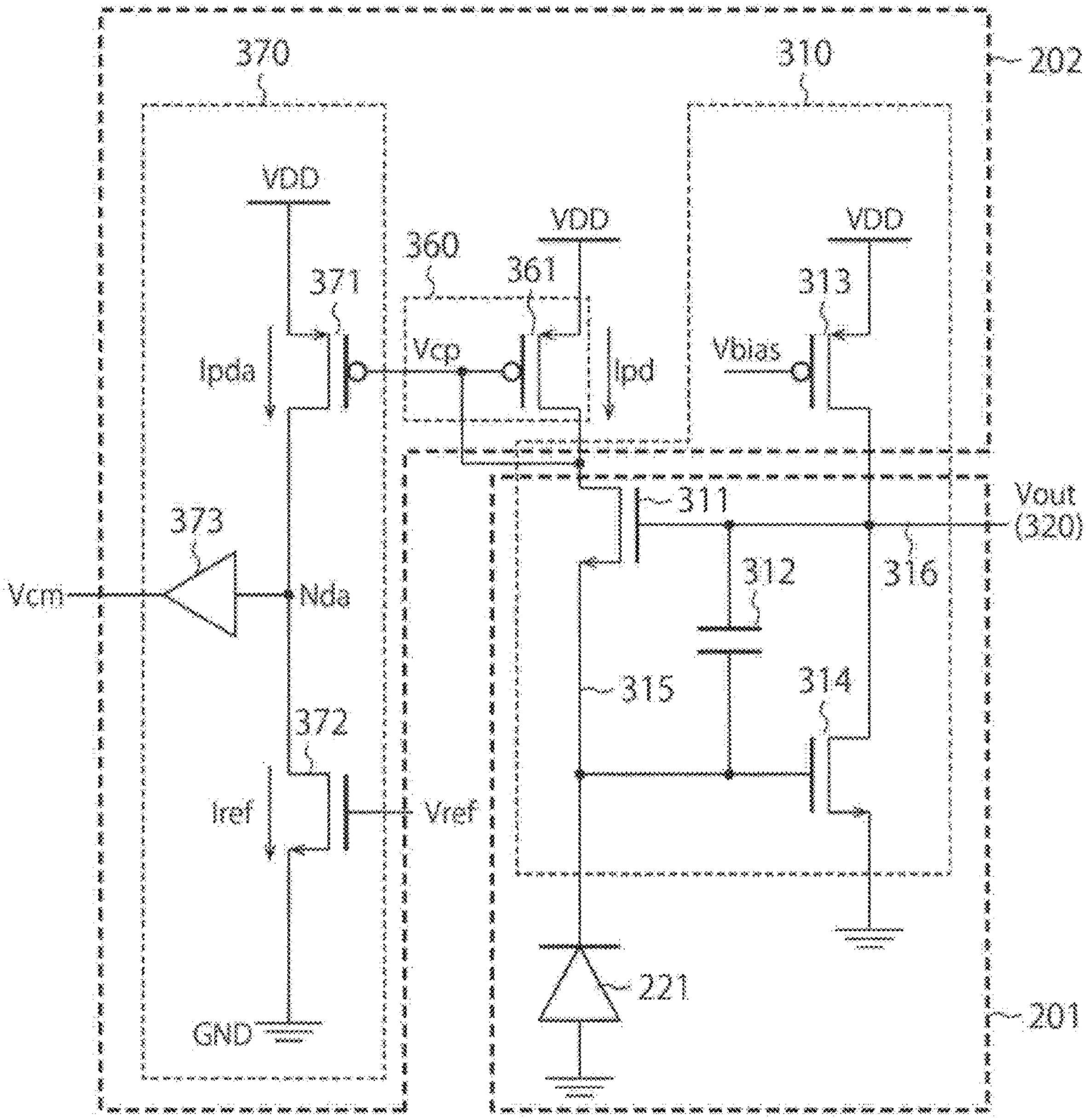
FIG. 16 is a circuit diagram illustrating a configuration example of the photodetection device according to the fourth embodiment.
Figure 17:
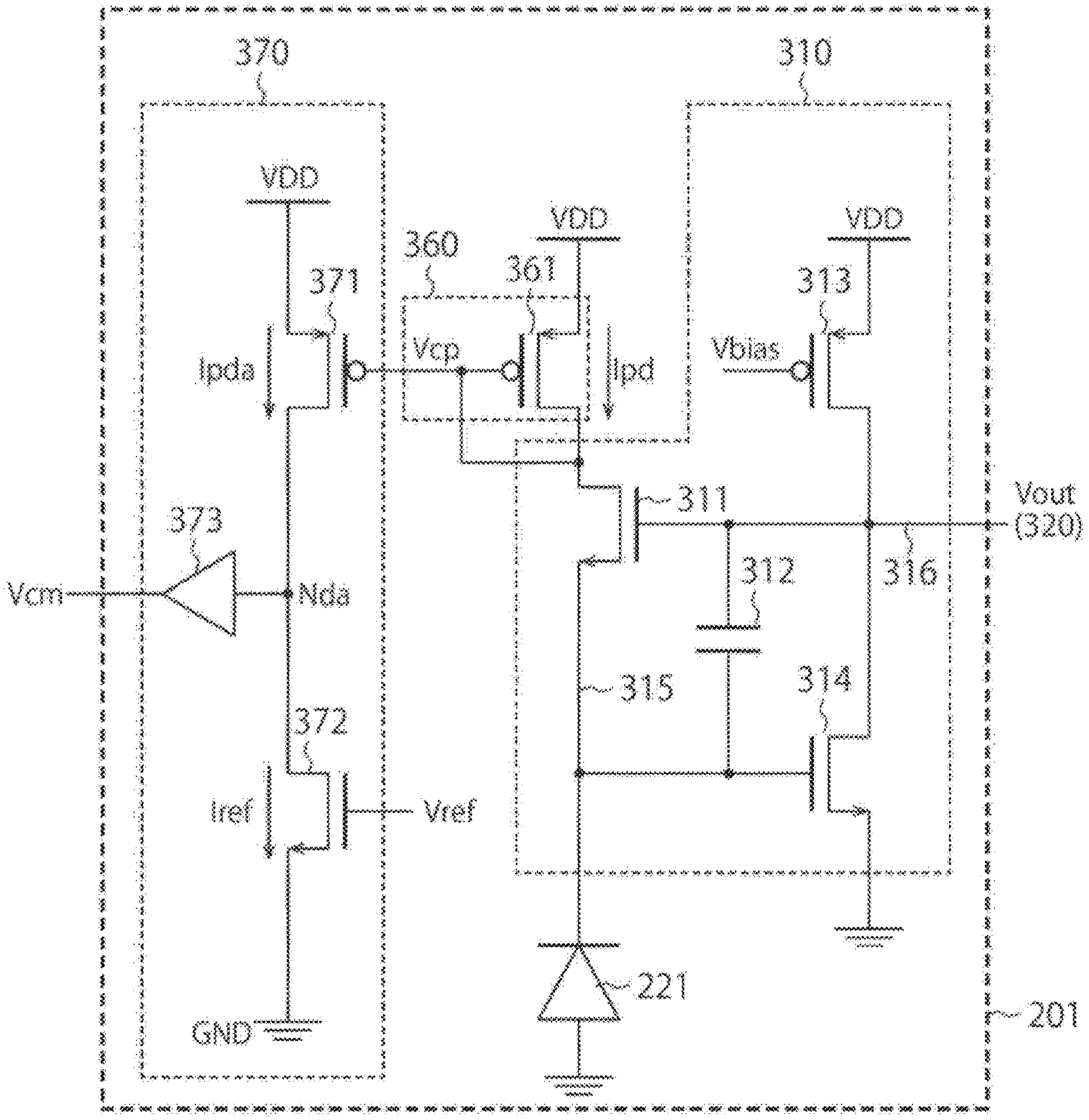
FIG. 17 is a circuit diagram illustrating a configuration example of the photodetection device according to the fourth embodiment.

FIGS. 15 to 17 are circuit diagrams illustrating a configuration example of a photodetection device 200 according to a fourth embodiment. FIGS. 15 to 17 illustrate specific examples of a light receiving chip 201 and a detection chip 202 illustrated in FIG. 2.

In FIG. 15, a photodiode 221 constituting first and second pixels PnL and PnR is a normal pixel 222, that is, the light reception unit 220 is constituted by one semiconductor chip as the light receiving chip 201. A configuration of another address event detection circuit 300 (a current-voltage conversion circuit 310, a luminance circuit 360, an AD conversion circuit 370, and the like) is formed as another semiconductor chip as the detection chip 202. The photodetection device 200 is formed such that the light receiving chip 201 and the detection chip 202 are stacked as illustrated in FIG. 2.

As a result, an area of the photodiode 221 can be increased, and an amount of received light can be increased.

In FIG. 16, the photodiode 221, a conversion transistor 311, a voltage supply transistor 314, and a capacitor 312 are formed by one semiconductor chip as the light receiving chip 201. That is, N-type MOS transistors 311 and 314 and the capacitor 312 of the current-voltage conversion circuit 310 are provided in the light receiving chip 201. A configuration of another address event detection circuit 300 (a current source transistor 313, the luminance circuit 360, the AD conversion circuit 370, and the like) is formed as another semiconductor chip as the detection chip 202. That is, a P-type MOS transistor 313 of the current-voltage conversion circuit 310 is provided in the detection chip 202.

By providing the N-type MOS transistors 311 and 314 on the light receiving chip 201, even if a circuit scale of the detection chip 202 is increased, it is possible to perform layout on the detection chip 202. That is, area efficiency of the light receiving chip 201 and the detection chip 202 can be improved.

In FIG. 17, the photodiode 221 and the address event detection circuit 300 are formed by one semiconductor chip as the light receiving chip 201. The signal processing circuit 240 (FIG. 4) at a subsequent stage connected to a voltage signal Vout is formed as the detection chip 202 in another semiconductor chip.

By providing the entire address event detection circuit 300 on the light receiving chip 201, even if a circuit scale of the signal processing circuit 240 is increased, the configuration can be made by the light receiving chip 201 and the detection chip 202. That is, area efficiency of the light receiving chip 201 and the detection chip 202 can be improved.

Fifth Embodiment

Figure 18:
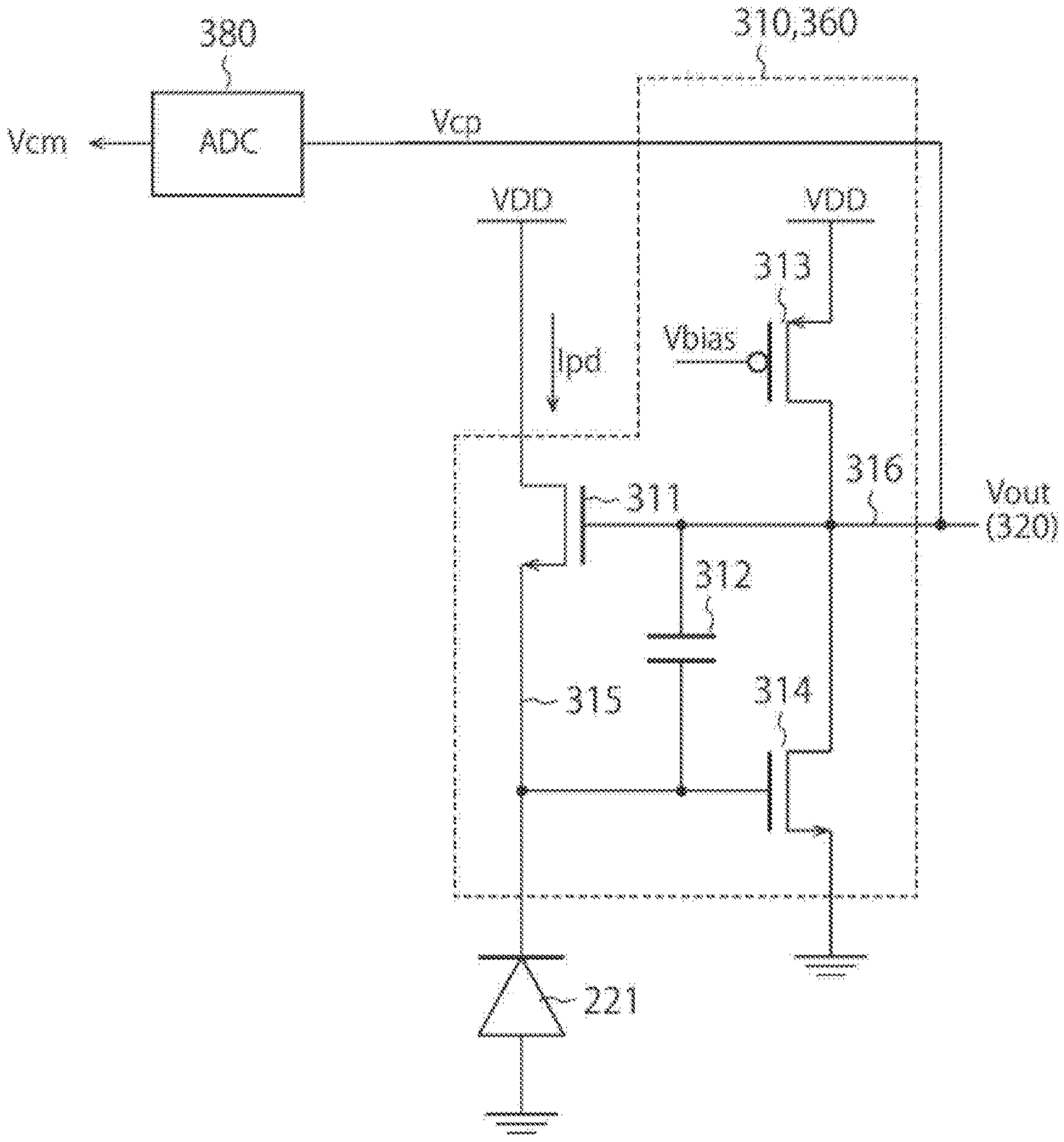
FIG. 18 is a circuit diagram illustrating a configuration example of a photodetection device according to a fifth embodiment.

FIG. 18 is a circuit diagram illustrating a configuration example of a photodetection device 200 according to a fifth embodiment. In the fifth embodiment, an AD conversion circuit 380 performs AD conversion on a voltage signal Vout output from a current-voltage conversion circuit 310 to generate a digital signal Vcm. Therefore, the current-voltage conversion circuit 310 also functions as a luminance circuit 360. In other words, each of first and second luminance circuits 360 has the same configuration as the current-voltage conversion circuit 310, and outputs the voltage signal Vout as a luminance signal Vcp. The AD conversion circuit 380 is connected to an output signal line 316. The AD conversion circuit 380 performs AD conversion on the voltage signal Vout into the digital signal Vcm by using the voltage signal Vout as the luminance signal Vcp. Other configurations and operations of the current-voltage conversion circuit 310 are similar to those of FIG. 7. Therefore, the fifth embodiment can obtain effects similar to those of the first embodiment.

Furthermore, according to the fifth embodiment, since the voltage signal Vout is used as the luminance signal Vcp, and the luminance signal Vcp is not generated from a photocurrent Ipd, the conversion transistor 361 can be omitted. Therefore, a circuit scale of the address event detection circuit 300 can be reduced.

Note that the fifth embodiment can be combined with any of the second to fourth embodiments and the modification.

Sixth Embodiment

Figure 19:
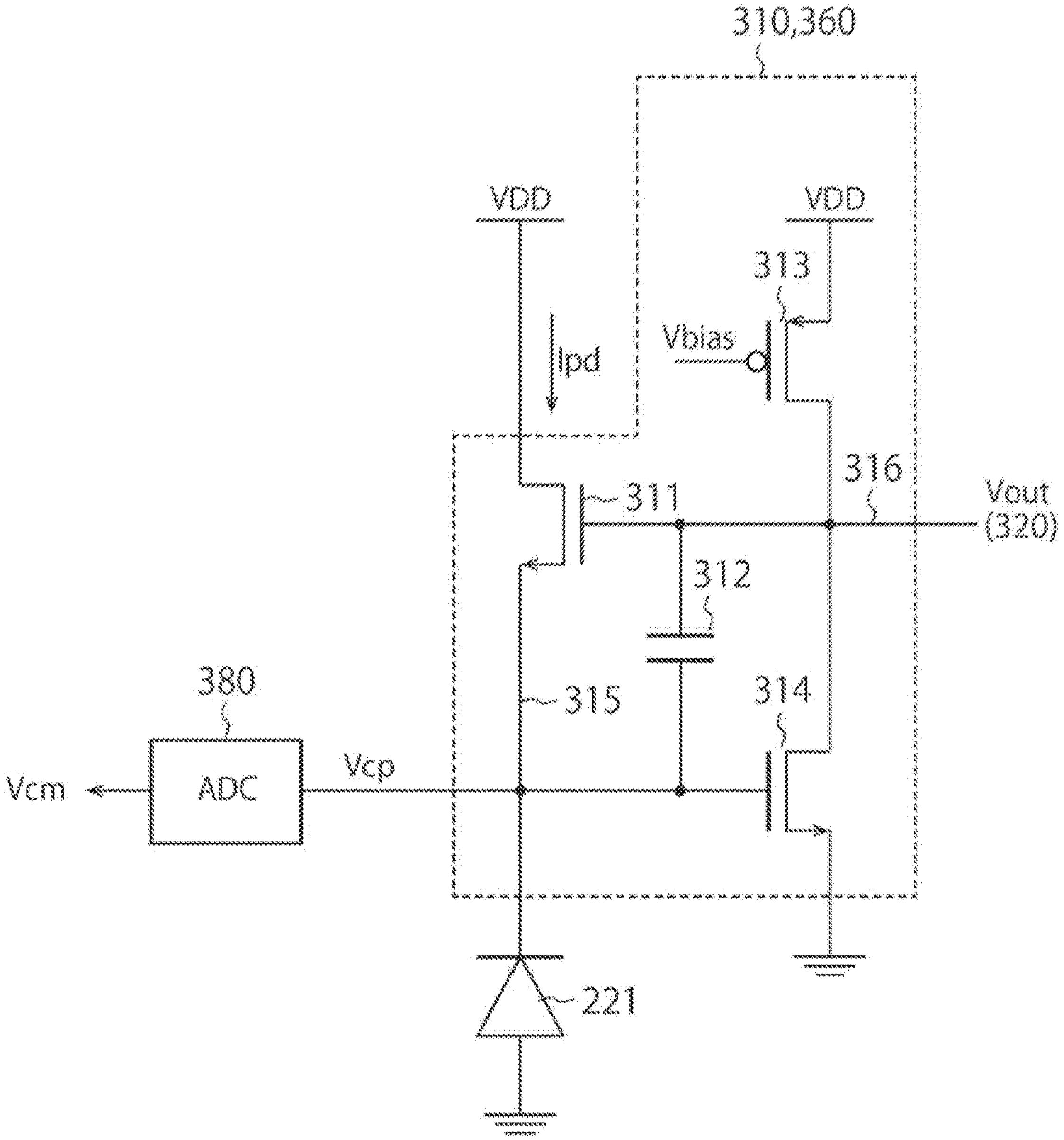
FIG. 19 is a circuit diagram illustrating a configuration example of a photodetection device according to a sixth embodiment.

FIG. 19 is a circuit diagram illustrating a configuration example of a photodetection device 200 according to a sixth embodiment. In the sixth embodiment, an AD conversion circuit 380 performs AD conversion on a voltage of an input signal line 315 as a luminance signal Vcp, to generate a digital signal Vcm. Therefore, the current-voltage conversion circuit 310 also functions as a luminance circuit 360. In other words, each of first and second luminance circuits 360 has the same configuration as that of the current-voltage conversion circuit 310, and outputs a voltage of the input signal line 315 as the luminance signal Vcp. The AD conversion circuit 380 performs AD conversion on the input signal line 315 into the digital signal Vcm by using the voltage of the input signal line 315 as the luminance signal Vcp. Other configurations and operations of the current-voltage conversion circuit 310 are similar to those of FIG. 7. Therefore, the sixth embodiment can obtain effects similar to those of the first embodiment.

Furthermore, according to the sixth embodiment, since the voltage of the input signal line 315 is used as the luminance signal Vcp, and the luminance signal Vcp is not generated from a photocurrent Ipd, a conversion transistor 361 can be omitted. Therefore, a circuit scale of the address event detection circuit 300 can be reduced.

Note that the sixth embodiment can be combined with any of the second to fourth embodiments and the modification.

Technology (present technology) according to the present disclosure is applicable to various products. For example, the technology according to an embodiment of the present disclosure may also be implemented as a device mounted on any type of mobile body such as an automobile, an electric automobile, a hybrid electric automobile, a motorcycle, a bicycle, a personal mobility, an airplane, a drone, a ship, and a robot.

Figure 20:
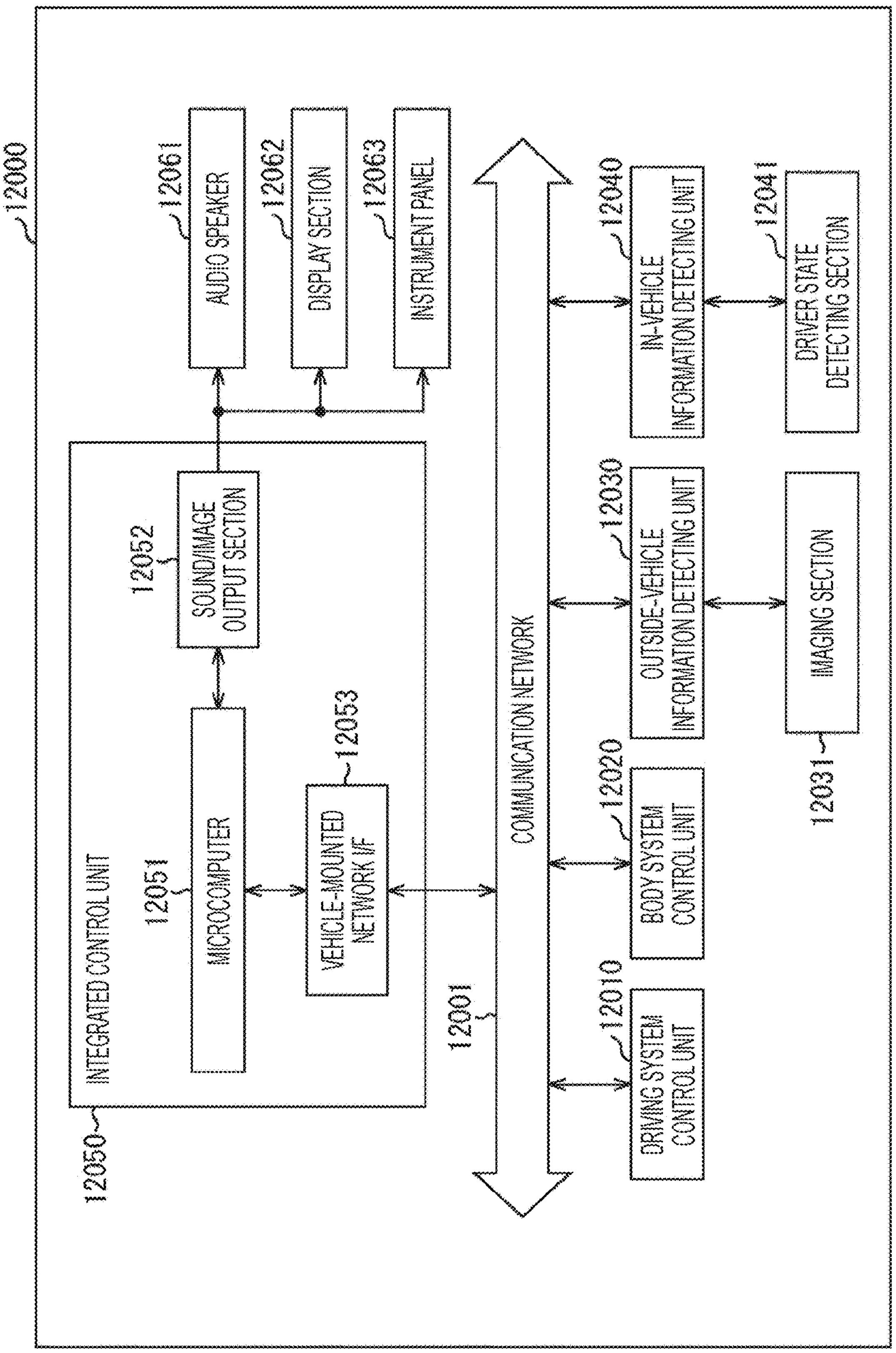
FIG. 20 is a block diagram illustrating an example of a schematic configuration of a vehicle control system.

FIG. 20 is a block diagram illustrating a schematic configuration example of a vehicle control system which is an example of a mobile body control system to which the technology according to the present disclosure can be applied.

The vehicle control system 12000 includes a plurality of electronic control units connected to each other via a communication network 12001. In the example illustrated in FIG. 20, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

Figure 21:
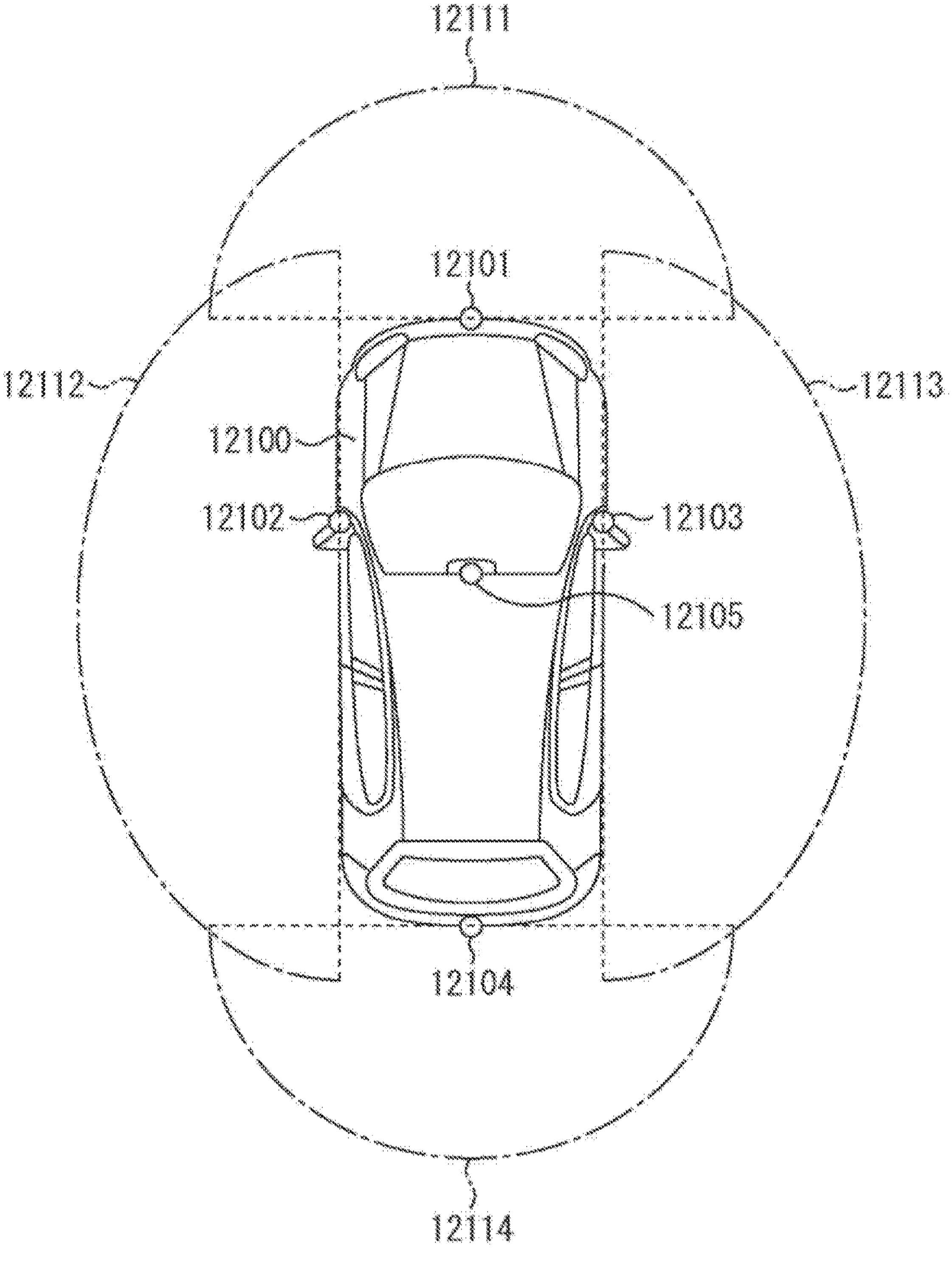
FIG. 21 is an explanatory view illustrating an example of installation positions of an outside-vehicle information detecting section and an imaging section.

The sound/image output section 12052 transmits an output signal of at least one of a sound and an image to an output device capable of visually or auditorily notifying information to an occupant of the vehicle or the outside of the vehicle. In the example of FIG. 20, an audio speaker 12061, a display section 12062, and an instrument panel 12063 are illustrated as output devices. The display section 12062 may, for example, include at least one of an on-board display and a head-up display. FIG. 21 is a view illustrating an example of the installation position of the imaging section 12031.

In FIG. 21, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that, FIG. 21 illustrates an example of image-capture ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of a vehicle control system to which the technology of the present disclosure can be applied has been described above. The imaging device 100 according to the present disclosure can be applied to the imaging section 12031 and the like, for example, among the configurations described above.

Note that the present technology can have the following configurations.

(1)

A photodetection device including:

a plurality of first pixels configured to photoelectrically convert incident light from a portion on one side to generate a first current;

a plurality of second pixels configured to photoelectrically convert the incident light from a portion on a side opposite to the portion on the one side of each of the first pixels to generate a second current;

a plurality of first luminance circuits provided individually corresponding to the plurality of first pixels and configured to generate a first luminance signal according to the first current;

a plurality of second luminance circuits provided individually corresponding to the plurality of second pixels and configured to generate a second luminance signal according to the second current;

a plurality of first current comparison circuits provided individually corresponding to the plurality of first pixels, and configured to compare the first luminance signal with a reference signal and convert the first luminance signal into a first digital signal;

a plurality of second current comparison circuits provided individually corresponding to the plurality of second pixels, and configured to compare the second luminance signal with the reference signal and convert the second luminance signal into a second digital signal; and a control unit configured to adjust a focal position of the incident light on the basis of the first digital signal and the second digital signal.

(2)

The photodetection device according to (1), in which the control unit adjusts the focal position such that the first and second digital signals from adjacent first and second pixels among the first pixels and the second pixels are substantially identical.

(3)

The photodetection device according to (1) or (2), in which the plurality of first pixels and the plurality of second pixels are alternately arranged adjacent to each other, and the control unit determines a shift direction and a shift amount of the focal position on the basis of an array of the first digital signals from the plurality of first pixels and an array of the second digital signals from the plurality of second pixels.

(4)

The photodetection device according to any one of (1) to (3), in which the control unit adjusts the focal position such that an array of the first digital signals from the plurality of first pixels and an array of the second digital signals from the plurality of second pixels are substantially identical.

(5)

The photodetection device according to any one of (1) to (4), further including:

a plurality of first current-voltage conversion circuits provided individually corresponding to the plurality of first pixels and configured to generate a first voltage signal according to the first current; and a plurality of second current-voltage conversion circuits provided individually corresponding to the plurality of second pixels and configured to generate a second voltage signal according to the second current.

(6)

The photodetection device according to (5), in which each of the first current-voltage conversion circuits includes:

a first conversion transistor configured to convert the first current into a first voltage signal and output the first voltage signal from a first gate;

a first current source transistor configured to supply a predetermined constant current to a first output signal line connected to the first gate; and a first voltage supply transistor configured to supply a constant voltage according to the predetermined constant current from the first output signal line to a source of the first conversion transistor, and each of the second current-voltage conversion circuits includes:

a second conversion transistor configured to convert the second current into a second voltage signal and output the second voltage signal from a second gate;

a second current source transistor configured to supply a predetermined constant current to a second output signal line connected to the second gate; and a second voltage supply transistor configured to supply a constant voltage according to the predetermined constant current from the second output signal line to a source of the second conversion transistor.

(7)

The photodetection device according to any one of (1) to (6), in which each of the first luminance circuits includes:

a third conversion transistor configured to convert the first current into a third voltage signal and output the third voltage signal from a gate, each of the second luminance circuits includes:

a fourth conversion transistor configured to convert the second current into a fourth voltage signal and output the fourth voltage signal from a gate, each of the first current comparison circuits includes:

a third current source transistor connected between a high voltage source and a first output unit and having a gate connected to a gate of the third conversion transistor, the third current source transistor being configured to cause a flow of a third current according to the first current; and a first reference current transistor connected between the first output unit and a low-voltage source and having a gate configured to receive the reference signal, the first reference current transistor being configured to cause a flow of a first reference current according to the reference signal, and each of the second current comparison circuits includes:

a fifth current source transistor connected between the high voltage source and a second output unit and having a gate connected to a gate of the fourth conversion transistor, the fifth current source transistor being configured to cause a flow of a fifth current according to the second current; and a second reference current transistor connected between the second output unit and the low-voltage source and having a gate configured to receive the reference signal, the second reference current transistor being configured to cause a flow of a second reference current according to the reference signal.

(8)

The photodetection device according to (7), in which each of the first current comparison circuits outputs a first digital signal from the first output unit in a case where the third current is larger than the first reference current, each of the first current comparison circuits outputs a second digital signal having inverse logic with respect to the first digital signal from the first output unit in a case where the third current is smaller than the first reference current, each of the second current comparison circuits outputs the first digital signal from the second output unit in a case where the fifth current is larger than the second reference current, and each of the second current comparison circuits outputs the second digital signal from the second output unit in a case where the fifth current is smaller than the second reference current.

(9)

The photodetection device according to (7) or (8), further including:

a first buffer connected to the first output unit; and a second buffer connected to the second output unit.

(10)

The photodetection device according to any one of (1) to (9), further including:

a plurality of third pixels configured to photoelectrically convert the incident light received on an entire surface to generate a third current, in which the plurality of first pixels and the plurality of second pixels are arranged adjacent to the plurality of third pixels and are alternately arranged substantially evenly.

(11)

The photodetection device according to (5) or (6), in which the photodetection device is formed by stacking: a first semiconductor chip including each of the first and second pixels; and a second semiconductor chip including each of the first and second current-voltage conversion circuits, each of the first and second luminance circuits, and each of the first and second current comparison circuits.

(12)

The photodetection device according to (6), in which the photodetection device is formed by stacking: a first semiconductor chip including the plurality of first and second pixels, the first and second conversion transistors, and the first and second voltage supply transistors; and a second semiconductor chip including the first and second current source transistors, each of the first and second luminance circuits, and each of the first and second current comparison circuits.

(13)

The photodetection device according to (5) or (6), in which the plurality of first and second pixels, each of the first and second current-voltage conversion circuits, each of the first and second luminance circuits, and each of the first and second current comparison circuits are formed by one semiconductor chip.

(14)

The photodetection device according to any one of (1) to (4), in which each of the first luminance circuits includes:

a first conversion transistor configured to convert the first current into a first voltage signal and output the first voltage signal from a first gate;

a first current source transistor configured to supply a predetermined constant current to a first output signal line connected to the first gate; and a first voltage supply transistor configured to supply a constant voltage according to the predetermined constant current from the first output signal line to a source of the first conversion transistor, and each of the second luminance circuits includes:

a second conversion transistor configured to convert the second current into a second voltage signal and output the second voltage signal from a second gate;

a second current source transistor configured to supply a predetermined constant current to a second output signal line connected to the second gate; and a second voltage supply transistor configured to supply a constant voltage according to the predetermined constant current from the second output signal line to a source of the second conversion transistor, each of the first current comparison circuits converts the first voltage signal into the first digital signal as the first luminance signal, and each of the second current comparison circuits converts the second voltage signal into the second digital signal as the second luminance signal.

(15)

The photodetection device according to any one of (1) to (4), in which each of the first luminance circuits includes:

a first conversion transistor configured to convert the first current into a first voltage signal and output the first voltage signal from a first gate;

a first current source transistor configured to supply a predetermined constant current to a first output signal line connected to the first gate; and a first voltage supply transistor configured to supply a constant voltage according to the predetermined constant current from the first output signal line to a source of the first conversion transistor, and each of the second luminance circuits includes:

a second conversion transistor configured to convert the second current into a second voltage signal and output the second voltage signal from a second gate;

a second current source transistor configured to supply a predetermined constant current to a second output signal line connected to the second gate; and a second voltage supply transistor configured to supply a constant voltage according to the predetermined constant current from the second output signal line to a source of the second conversion transistor, each of the first current comparison circuits converts a gate voltage of the first voltage supply transistor into the first digital signal as the first luminance signal, and each of the second current comparison circuits converts a gate voltage of the second voltage supply transistor into the second digital signal as the second luminance signal.

(16)

The photodetection device according to any one of (1) to (15), in which, in a case where logic of the first and second digital signals is biased to one side, the control unit changes the reference signal.

(17)

The photodetection device according to (1), in which the first and second pixels are adjacent to each other and constitute a plurality of third pixels configured to photoelectrically convert the incident light received on an entire surface to generate a third current.

Note that the present disclosure is not limited to the above-described embodiments, and various modifications can be made without departing from the gist of the present disclosure. Furthermore, the effects described in the present description are merely examples and are not limited, and other effects may be provided.

REFERENCE SIGNS LIST

100 Imaging device
110 Imaging lens
200 Photodetection device
120 Recording unit
130 Control unit
300 Address event detection circuit
310 Current-voltage conversion circuit
320 Buffer
330 Subtractor
340 Quantizer
350 Transfer circuit
360 Luminance circuit
370 Current comparison circuit
311 Conversion transistor
312 Capacitor
313 Current source transistor
314 Voltage supply transistor
361 Conversion transistor
371 Current source transistor
372 Reference current transistor
373 Buffer
PnL First pixel
PnR Second pixel
222 Normal pixel

The invention claimed is:

1. A photodetection device comprising:

a plurality of first pixels configured to photoelectrically convert incident light from a portion on one side to generate a first current;

a plurality of second pixels configured to photoelectrically convert the incident light from a portion on a side opposite to the portion on the one side of each of the first pixels to generate a second current;

a plurality of first luminance circuits provided individually corresponding to the plurality of first pixels and configured to generate a first luminance signal according to the first current;

a plurality of second luminance circuits provided individually corresponding to the plurality of second pixels and configured to generate a second luminance signal according to the second current;

a plurality of first current comparison circuits provided individually corresponding to the plurality of first pixels, and configured to compare the first luminance signal with a reference signal and convert the first luminance signal into a first digital signal;

a plurality of second current comparison circuits provided individually corresponding to the plurality of second pixels, and configured to compare the second luminance signal with the reference signal and convert the second luminance signal into a second digital signal; and a control unit configured to adjust a focal position of the incident light on a basis of the first digital signal and the second digital signal.

2. The photodetection device according to claim 1, wherein the control unit adjusts the focal position such that the first and second digital signals from adjacent first and second pixels among the first pixels and the second pixels are substantially identical.

3. The photodetection device according to claim 1, wherein the plurality of first pixels and the plurality of second pixels are alternately arranged adjacent to each other, and the control unit determines a shift direction and a shift amount of the focal position on a basis of an array of the first digital signals from the plurality of first pixels and an array of the second digital signals from the plurality of second pixels.

4. The photodetection device according to claim 1, wherein the control unit adjusts the focal position such that an array of the first digital signals from the plurality of first pixels and an array of the second digital signals from the plurality of second pixels are substantially identical.

5. The photodetection device according to claim 1, further comprising:

a plurality of first current-voltage conversion circuits provided individually corresponding to the plurality of first pixels and configured to generate a first voltage signal according to the first current; and a plurality of second current-voltage conversion circuits provided individually corresponding to the plurality of second pixels and configured to generate a second voltage signal according to the second current.

6. The photodetection device according to claim 5, wherein each of the first current-voltage conversion circuits includes:

a first conversion transistor configured to convert the first current into a first voltage signal and output the first voltage signal from a first gate;

a first current source transistor configured to supply a predetermined constant current to a first output signal line connected to the first gate; and a first voltage supply transistor configured to supply a constant voltage according to the predetermined constant current from the first output signal line to a source of the first conversion transistor, and each of the second current-voltage conversion circuits includes:

a second conversion transistor configured to convert the second current into a second voltage signal and output the second voltage signal from a second gate;

a second current source transistor configured to supply a predetermined constant current to a second output signal line connected to the second gate; and a second voltage supply transistor configured to supply a constant voltage according to the predetermined constant current from the second output signal line to a source of the second conversion transistor.

7. The photodetection device according to claim 6, wherein the photodetection device is formed by stacking: a first semiconductor chip including the plurality of first and second pixels, the first and second conversion transistors, and the first and second voltage supply transistors; and a second semiconductor chip including the first and second current source transistors, each of the first and second luminance circuits, and each of the first and second current comparison circuits.

8. The photodetection device according to claim 5, wherein the photodetection device is formed by stacking: a first semiconductor chip including each of the first and second pixels; and a second semiconductor chip including each of the first and second current-voltage conversion circuits, each of the first and second luminance circuits, and each of the first and second current comparison circuits.

9. The photodetection device according to claim 5, wherein the plurality of first and second pixels, each of the first and second current-voltage conversion circuits, each of the first and second luminance circuits, and each of the first and second current comparison circuits are formed by one semiconductor chip.

10. The photodetection device according to claim 1, wherein each of the first luminance circuits includes:

a third conversion transistor configured to convert the first current into a third voltage signal and output the third voltage signal from a gate, each of the second luminance circuits includes:

a fourth conversion transistor configured to convert the second current into a fourth voltage signal and output the fourth voltage signal from a gate, each of the first current comparison circuits includes:

a third current source transistor connected between a high voltage source and a first output unit and having a gate connected to a gate of the third conversion transistor, the third current source transistor being configured to cause a flow of a third current according to the first current; and a first reference current transistor connected between the first output unit and a low-voltage source and having a gate configured to receive the reference signal, the first reference current transistor being configured to cause a flow of a first reference current according to the reference signal, and each of the second current comparison circuits includes:

a fifth current source transistor connected between the high voltage source and a second output unit and having a gate connected to a gate of the fourth conversion transistor, the fifth current source transistor being configured to cause a flow of a fifth current according to the second current; and a second reference current transistor connected between the second output unit and the low-voltage source and having a gate configured to receive the reference signal, the second reference current transistor being configured to cause a flow of a second reference current according to the reference signal.

11. The photodetection device according to claim 10, wherein each of the first current comparison circuits outputs a first digital signal from the first output unit in a case where the third current is larger than the first reference current, each of the first current comparison circuits outputs a second digital signal having inverse logic with respect to the first digital signal from the first output unit in a case where the third current is smaller than the first reference current, each of the second current comparison circuits outputs the first digital signal from the second output unit in a case where the fifth current is larger than the second reference current, and each of the second current comparison circuits outputs the second digital signal from the second output unit in a case where the fifth current is smaller than the second reference current.

12. The photodetection device according to claim 10, further comprising:

a first buffer connected to the first output unit; and a second buffer connected to the second output unit.

13. The photodetection device according to claim 1, further comprising:

a plurality of third pixels configured to photoelectrically convert the incident light received on an entire surface to generate a third current, wherein the plurality of first pixels and the plurality of second pixels are arranged adjacent to the plurality of third pixels and are alternately arranged substantially evenly.

14. The photodetection device according to claim 1, wherein each of the first luminance circuits includes:

a first conversion transistor configured to convert the first current into a first voltage signal and output the first voltage signal from a first gate;

a first current source transistor configured to supply a predetermined constant current to a first output signal line connected to the first gate; and a first voltage supply transistor configured to supply a constant voltage according to the predetermined constant current from the first output signal line to a source of the first conversion transistor, and each of the second luminance circuits includes:

a second conversion transistor configured to convert the second current into a second voltage signal and output the second voltage signal from a second gate;

a second current source transistor configured to supply a predetermined constant current to a second output signal line connected to the second gate; and a second voltage supply transistor configured to supply a constant voltage according to the predetermined constant current from the second output signal line to a source of the second conversion transistor, each of the first current comparison circuits converts the first voltage signal into the first digital signal as the first luminance signal, and each of the second current comparison circuits converts the second voltage signal into the second digital signal as the second luminance signal.

15. The photodetection device according to claim 1, wherein each of the first luminance circuits includes:

a first conversion transistor configured to convert the first current into a first voltage signal and output the first voltage signal from a first gate;

a first current source transistor configured to supply a predetermined constant current to a first output signal line connected to the first gate; and a first voltage supply transistor configured to supply a constant voltage according to the predetermined constant current from the first output signal line to a source of the first conversion transistor, and each of the second luminance circuits includes:

a second conversion transistor configured to convert the second current into a second voltage signal and output the second voltage signal from a second gate;

a second current source transistor configured to supply a predetermined constant current to a second output signal line connected to the second gate; and a second voltage supply transistor configured to supply a constant voltage according to the predetermined constant current from the second output signal line to a source of the second conversion transistor, each of the first current comparison circuits converts a gate voltage of the first voltage supply transistor into the first digital signal as the first luminance signal, and each of the second current comparison circuits converts a gate voltage of the second voltage supply transistor into the second digital signal as the second luminance signal.

16. The photodetection device according to claim 1, wherein, in a case where logic of the first and second digital signals is biased to one side, the control unit changes the reference signal.

17. The photodetection device according to claim 1, wherein the first and second pixels are adjacent to each other and constitute a plurality of third pixels configured to photoelectrically convert the incident light received on an entire surface to generate a third current.

* * * * *